INVENTORS
ROBERT A. CRANE,
PRENTICE C. WHARFF, JR.
BY Miles U. Sellers
ATTORNEY

INVENTORS
ROBERT A. CRANE,
PRENTICE C. WHARFF, JR.
BY
ATTORNEY

TENSILE TESTER

Filed April 15, 1959 10 Sheets-Sheet 3

INVENTORS
ROBERT A. CRANE,
PRENTICE C. WHARFF, JR.
BY Miles S. Pillans
ATTORNEY

INVENTORS
ROBERT A. CRANE,
PRENTICE C. WHARFF, JR.
BY [signature]
ATTORNEY

TENSILE TESTER

INVENTORS
ROBERT A. CRANE,
PRENTICE C. WHARFF, JR.
BY Miles J. Pillars
ATTORNEY

Dec. 11, 1962 R. A. CRANE ET AL 3,067,607

TENSILE TESTER

Filed April 15, 1959 10 Sheets-Sheet 6

INVENTORS
ROBERT A. CRANE,
PRENTICE C. WHARFF, JR.

ATTORNEY

INVENTORS
ROBERT A. CRANE,
PRENTICE C. WHARFF, JR.
BY Miles D. Pillars
ATTORNEY

INVENTORS
ROBERT A. CRANE,
PRENTICE C. WHARFE, JR.

BY Miles [signature]

ATTORNEY

-ELONGATION CIRCUIT DIAGRAM-

-STRAIN GAGE CIRCUIT DIAGRAM-

-STRESS RECORDING- -DENIER RECORDING-

INVENTORS
ROBERT A. CRANE,
PRENTICE C. WHARER, JR.

[signature]

ATTORNEY

Dec. 11, 1962

R. A. CRANE ET AL 3,067,607

TENSILE TESTER

Filed April 15, 1959

10 Sheets-Sheet 10

INVENTORS

ROBERT A. CRANE,
PRENTICE C. WHARFF, JR.

BY [signature]

ATTORNEY

United States Patent Office 3,067,607
Patented Dec. 11, 1962

3,067,607

TENSILE TESTER

Robert A. Crane, Concord, and Prentice C. Wharff, Jr., Lafayette, Calif., assignors to The Dow Chemical Company, Midland, Mich., a corporation of Delaware Filed Apr. 15, 1959, Ser. No. 806,705
35 Claims. (Cl. 73—89)

This invention relates to tensile testers, and is particularly directed to an improved apparatus for more accurately determining the tensile properties of specimens, such as single fibers, filaments, and similar unitary elements, and to provide for automatically giving an indication of the stress per unit cross-sectional area of the specimen in relation to the percentage elongation and other tensile characteristics thereof. The apparatus includes an improved system for rendering a high sensitivity indication of the tensile test properties for those portions of the test relating to the modulus of elasticity through the yield point of the specimen and automatically providing for a lower sensitivity indication of the stress-strain relationship of the specimen undergoing tests for that portion of the tensile test between the yield point and the final breaking of the specimen under tension, and automatically indicating the pre-stressed cross-sectional area of the specimen. Alternatively, the system may be operated at a plurality of uniform test sensitivities throughout a complete test. The invention also includes detailed improvements for providing a more uniform type of test so that the results can be more easily compared and so that repetitive testing can be performed by unskilled or semi-skilled operators with the assurance of reliable comparable results. These detailed features of the present invention include improved arrangements for preparing and holding specimens during tests and to improved details for properly locating test specimens on the apparatus for test purposes, and for purging the apparatus of broken specimens on the completion of each test.

Tensile testers of the type to which this invention pertains have, in the past, usually provided for an indication of the tension in terms of the total force applied in stressing the specimen. Furthermore, tensile testers for relatively small specimens, such as threads, have generally provided for securing a predetermined length of the specimen between a pair of holding members of the apparatus, which exert the tension on the specimen. It has been found that such tensile testers do not provide reliable results where single filaments or fibers of relatively small cross-sectional area have to be tested. This results partly because of the unique problems which are presented by the specimens which are to be tested. The delicate nature of the specimens, such as very fine synthetic fibers, requires that a technique be used which minimizes handling of the specimen in order to minimize possible pre-stressing of the specimen before a test is made. In addition, the delicate structure of single fiber specimens and the requirement for repetitive tests in order to provide for quality control require that manual manipulation of the specimen and the tester should be reduced to a minimum. It is highly desirable, therefore, that the tester should be completely automatic so as to require no further attention on the part of an operator after a test has been begun.

Tensile testers for indicating properties of fine fibers usually require that the single fibers be attached to holding elements which can conveniently take the form of tabs attached to the fibers before being placed on the testing apparatus. The use of this procedure requires that the distance between the tabs be kept as constant as possible for all test specimens in order that the elongation of the specimen undergoing tests will define a true property of the fiber. Holding elements, such as tabs, usually can best be secured to fibers by cementing the ends of the fibers to the tabs. This method of attaching tabs to specimen fibers inherently results in variations in the length of free fiber between the points cemented to the tabs, as the adhesive or cementing material cannot assuredly always be placed on the same point on the tab and the fiber. Thus, the distance between the tabs, which defines the length of the fiber to be tested, will vary with each specimen, and the measure of the elongation of any particular specimen will not have a direct relationship to the percent elongation or to the elongation per unit of length of the specimen.

In addition, most fibers are extremely delicate and have a variable amount of crimp, so that a great deal of care must be exercised in mounting a fiber on the tabs in order not to stretch the fiber prior to the beginning of a test. It has been found that the length of fiber as defined by holding elements, such as the tabs previously described, may vary as much as 15% of the gage length in extreme cases of highly crimped fibers, with an average error of less than 5%. If strain measurements of fibers mounted in this manner are to have definite value in determining properties and characteristics of the fibers, such errors in the actual length of the fibers prior to testing must be corrected. It is desirable, therefore, that the tensile tester should give an automatic indication of the percentage elongation rather than an indication of the actual elongation of a specimen undergoing tests, so that the test results can be reliably and quickly compared for purposes of production quality control and for purposes of defining the true characteristics of the fibers.

In order further to assure uniformity of tests and in order to minimize handling of samples, a tensile tester incorporating the present invention is provided with an arrangement for automatically purging the device of specimens or parts of specimens remaining on the apparatus after a test has been completed. In some instances, the tensile tester also may be provided with an arrangement for automatically positioning the specimen filament holding tab on the apparatus in order to assure uniformity of the positions of the specimens and holding elements for all tests performed by the apparatus. It is also highly desirable that the tester should provide an indication which can be made part of a permanent record of the cross-sectional area of each specimen fiber, so that the stress-strain relationship can be directly correlated to the cross-sectional area of the specimen. This also provides a record of variations of the cross-sectional area of the test specimens.

An object of this invention is to provide an improved tensile tester.

Another object of this invention is to provide a tensile tester specifically improved to perform tensile tests on single filament fiber specimens with a minimum of manual manipulation.

A further object of this invention is to provide an improved tensile tester operable substantially automatically after a test has been begun with the various sequential test steps operable in response to the occurrence of predetermined steps in the testing process or characteristics of the specimens undergoing such tests.

Still another object of the present invention is to provide a tensile tester which will give a direct indication of the stress-strain relationship of a specimen undergoing a tensile test with an automatic correction of the stress to indicate the force per unit cross-sectional area and to correct for mounting length variations to provide for an indication of strain in the specimen in terms of percentage elongation rather than actual elongation thereof.

A still further object of this invention is to provide an improved tensile tester which will automatically give indications of stress-strain relations of a specimen undergoing tests in terms of force per unit cross-sectional area and percentage elongation, which can be automatically recorded as a stress-strain curve.

An additional object of this invention is to provide a tensile tester as defined in the last preceding paragraph, wherein the stress-strain relationship will be indicated with a degree of high sensitivity during that part of the test which indicates the modulus of elasticity and the yield strength of the specimen and will automatically shift the indication of the stress-strain relationship to a lower sensitivity for the remainder of the test to the point where the specimen breaks, so that a complete indication of the test can be recorded on a single test sheet.

Yet an additional object of this invention is to provide a tensile tester of the latter type wherein an indication will be given of the pre-stressed cross-sectional area of the specimen and this indication will automatically be provided after the specimen has been broken so that a record will automatically be made thereof on the same record sheet indicating the stress-strain test results.

A still further object of the present invention is to provide a tensile tester which will automatically provide indications of stress in terms of tensile force on the specimen per unit cross-sectional area thereof and strain in terms of percentage elongation, and which will automatically provide for the elimination of the indication of strain in the specimen below a predetermined relatively small initial stress thereof, so as to eliminate variations in the stress-strain relationship produced by variations in the crimp of different specimens whereby all indications of strain begin with a constant relatively small known pre-stress of all specimens.

Yet another object of this invention is to provide a tensile tester which will automatically correct for cross-sectional area variations of test specimens in indicating the stress on the specimens and automatically correct for variations in initial lengths and crimp of test specimens to provide an indication of strain in terms of percentage elongation, with an arrangement for providing these stress-strain indications in a plurality of sensitivities which may be used singly for any given test, which may be shifted automatically during tests in a predetermined sequence, or which may be manually controlled as desired.

Further objects and advantages of this invention will become apparent from the following description referring to the accompanying drawings, and the features of novelty which characterize this invention will be pointed out with particularity in the claims appended to and forming a part of this specification.

Figure 1:
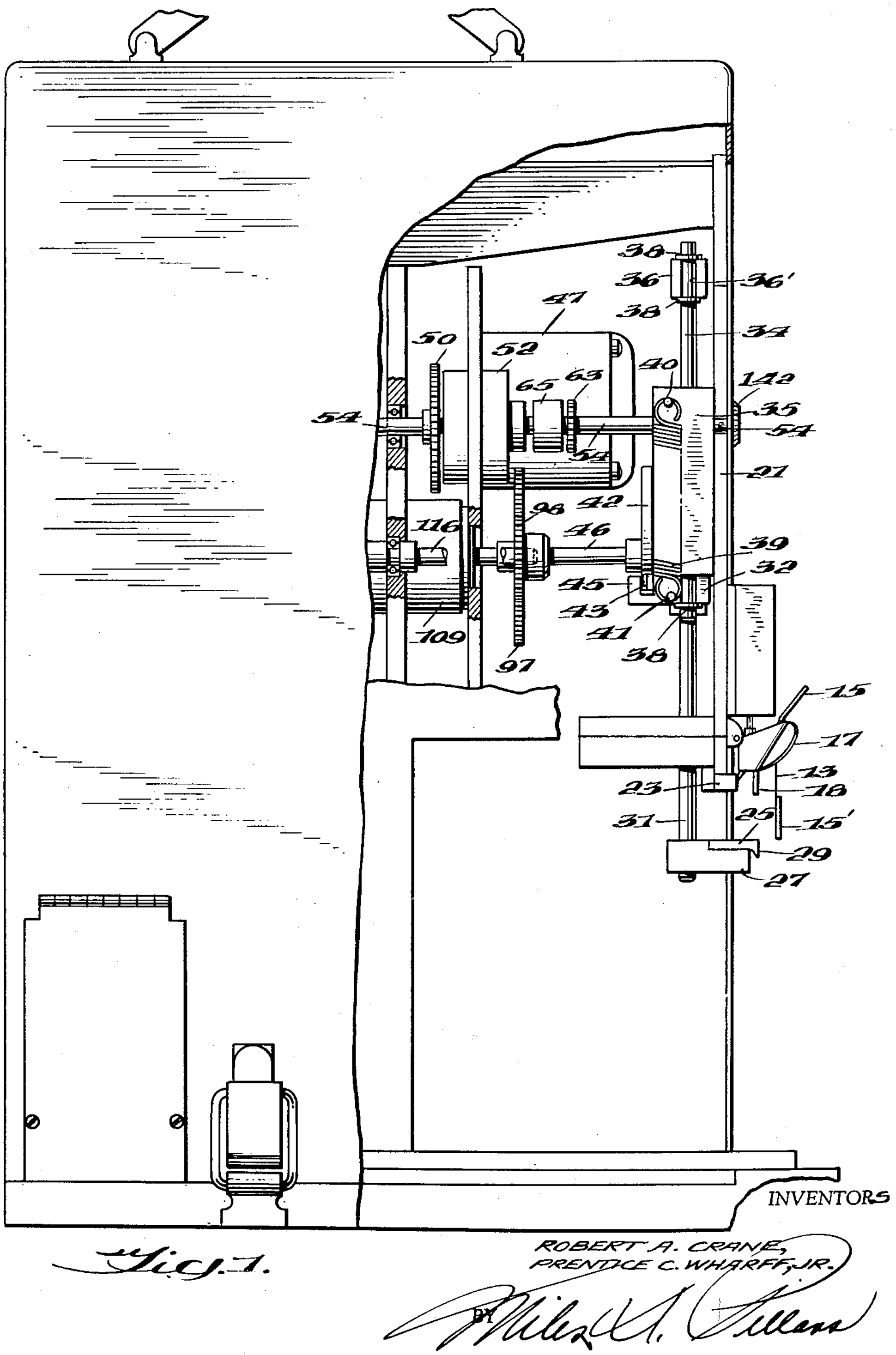
FIG. 1 is a side elevational view of a unit of a tensile tester incorporating the present invention with a part of the casing broken away better to illustrate certain operating elements of the tester.
Figure 2:
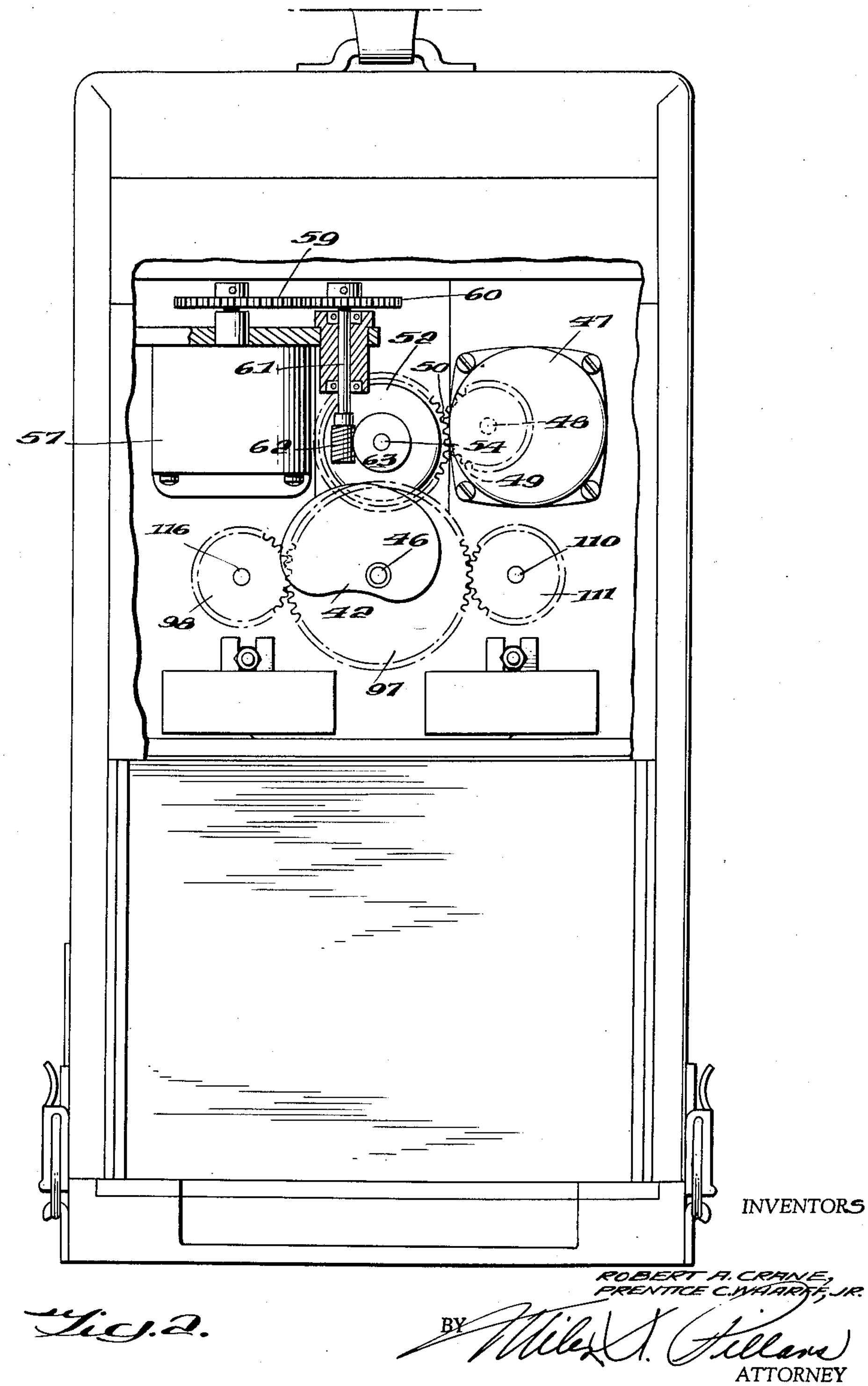
FIG. 2 is a front elevational view of the unit of the tensile tester shown in FIG. 1 with a part of the front casing, the loading chute and tab holder, and the extension yoke assembly broken away more clearly to illustrate certain of the driving elements and their relationship in this tester.
Figure 3A:
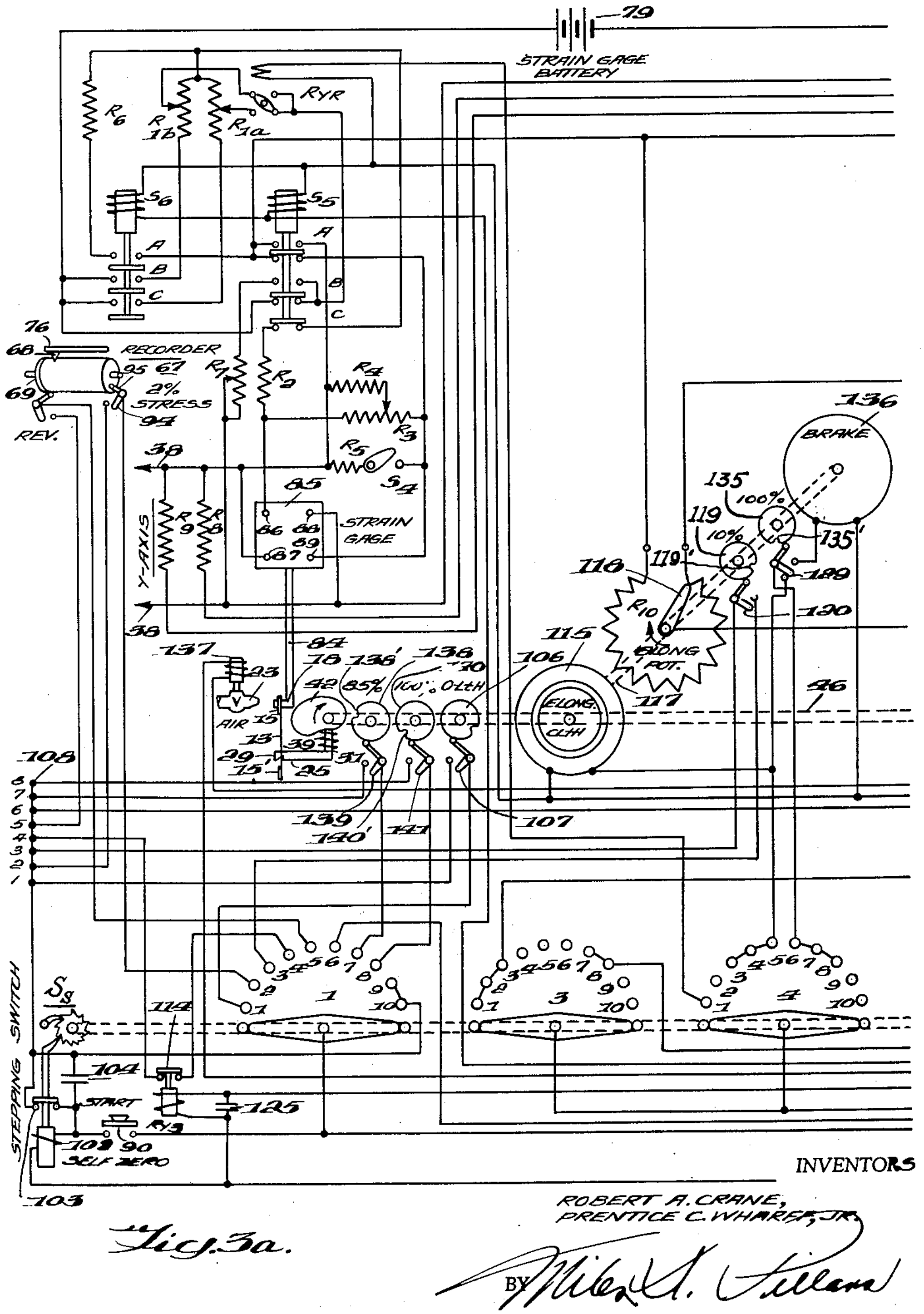
Figure 3B:
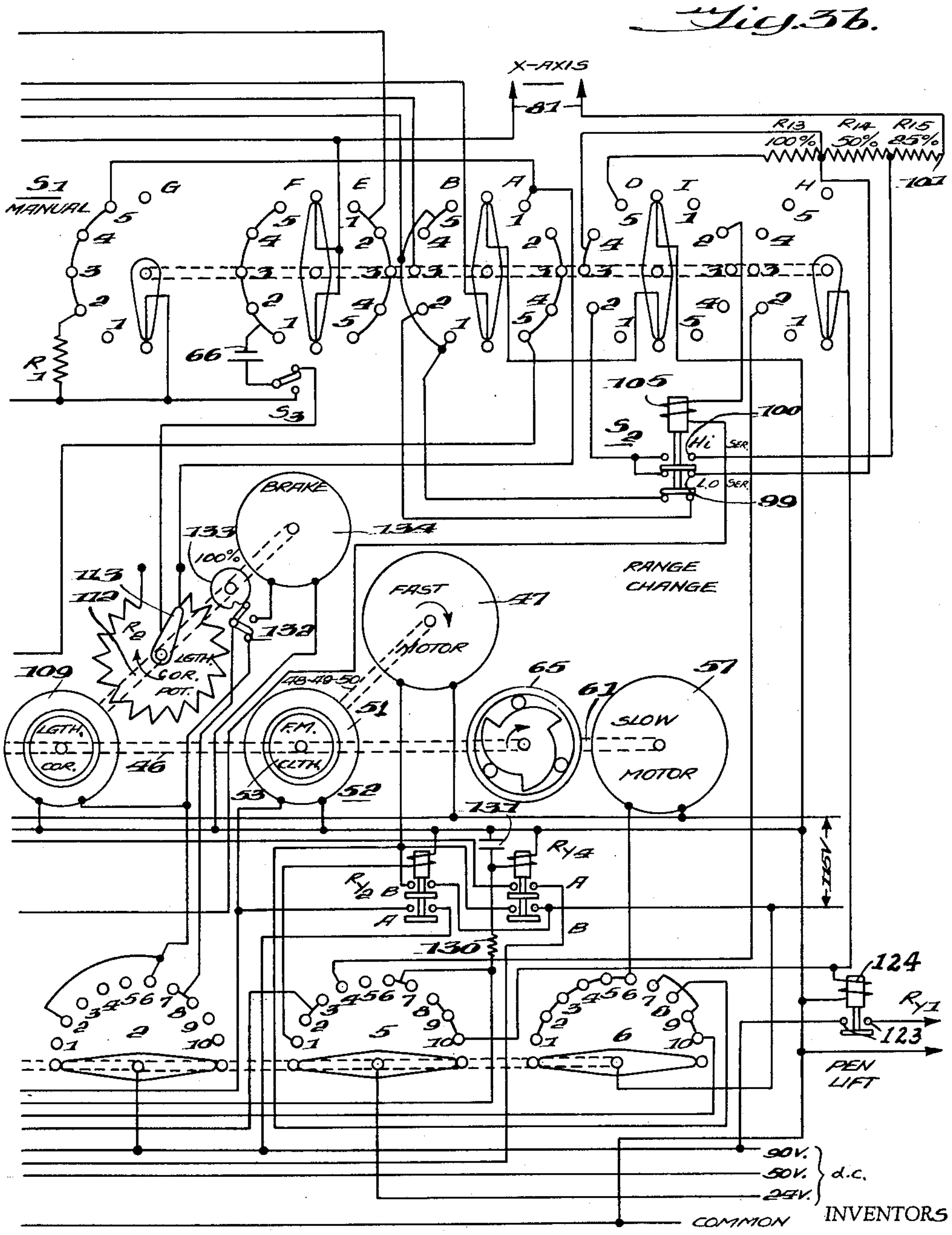
Figure 4:
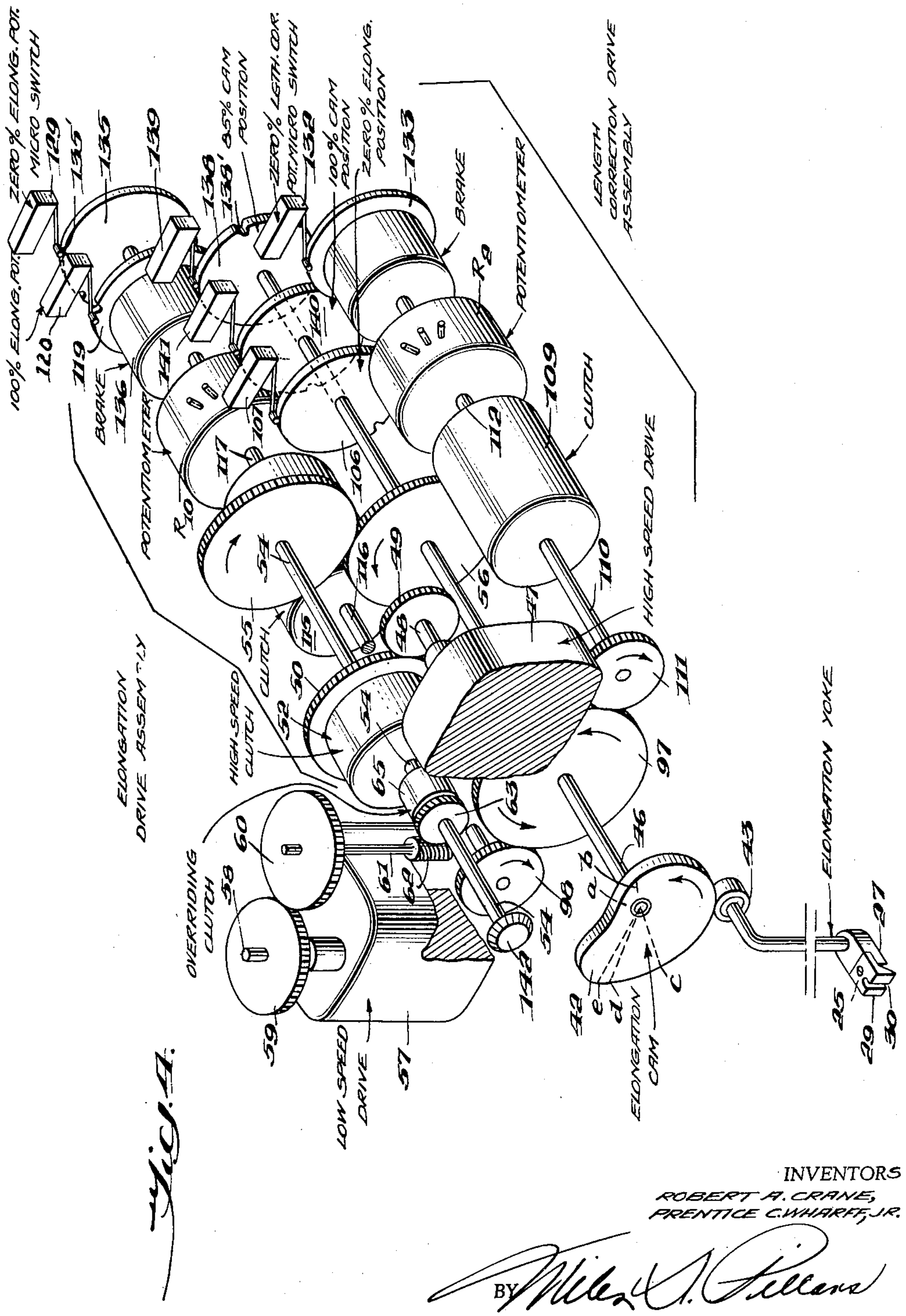
Figure 5:
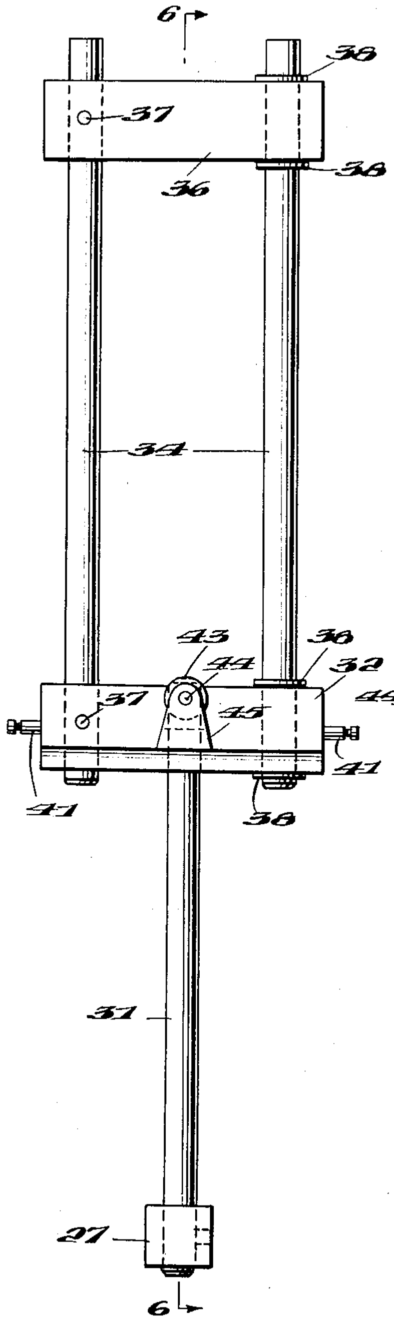
Figures 6, 7:
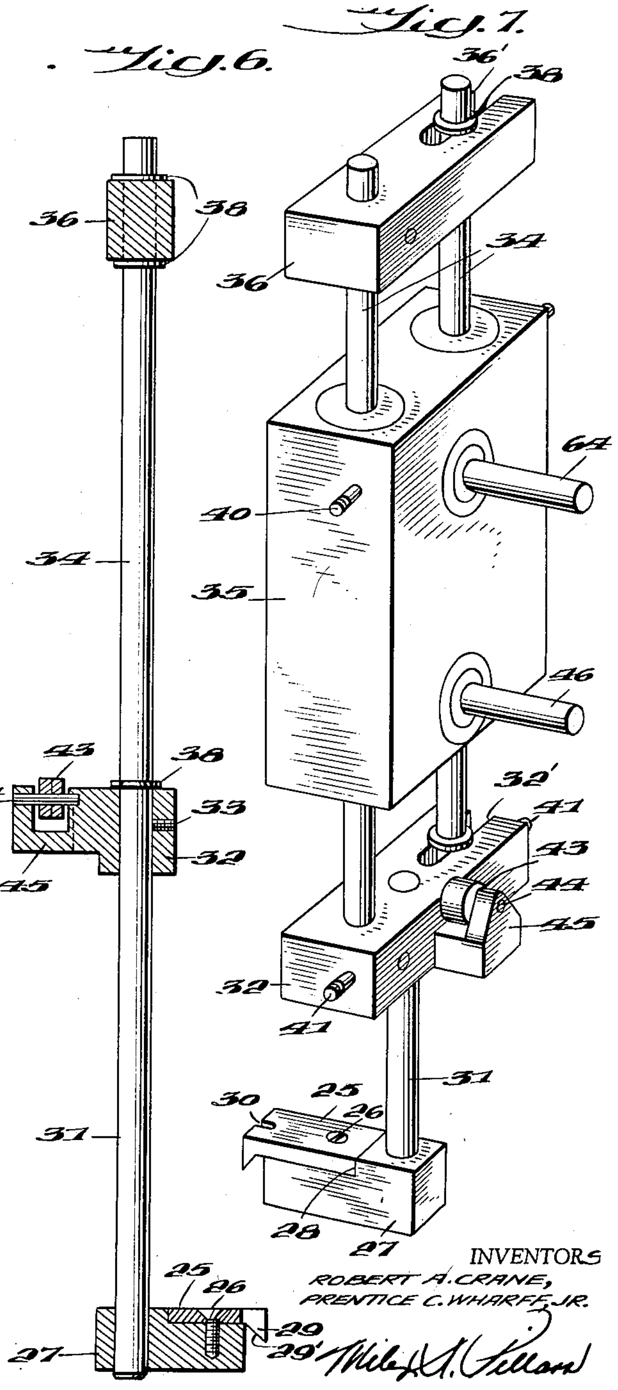
Figures 8, 9, 10:
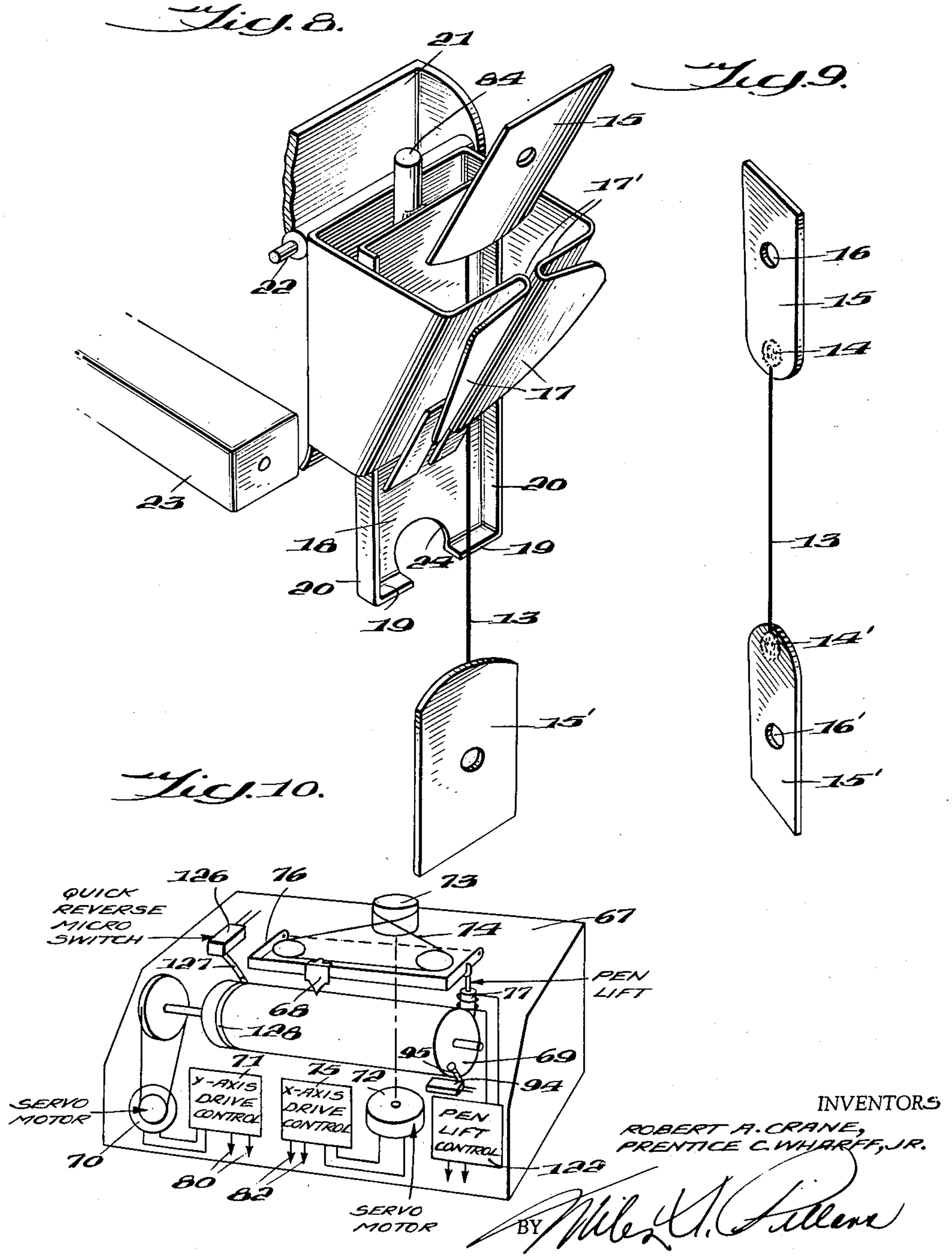
Figure 11:
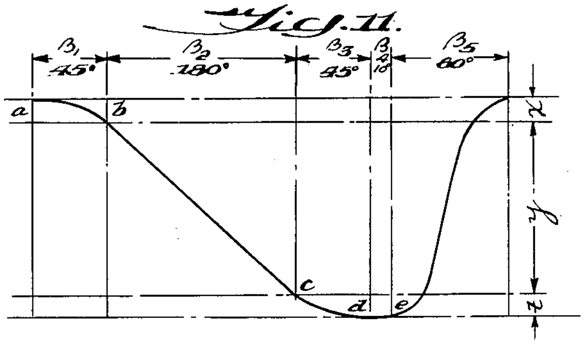
Figure 12:
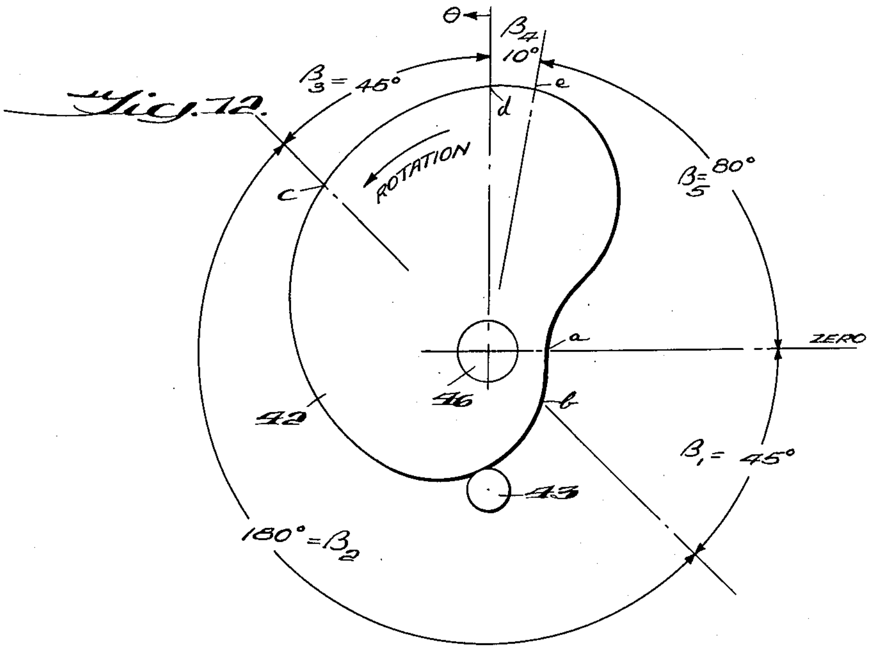
Figure 13:
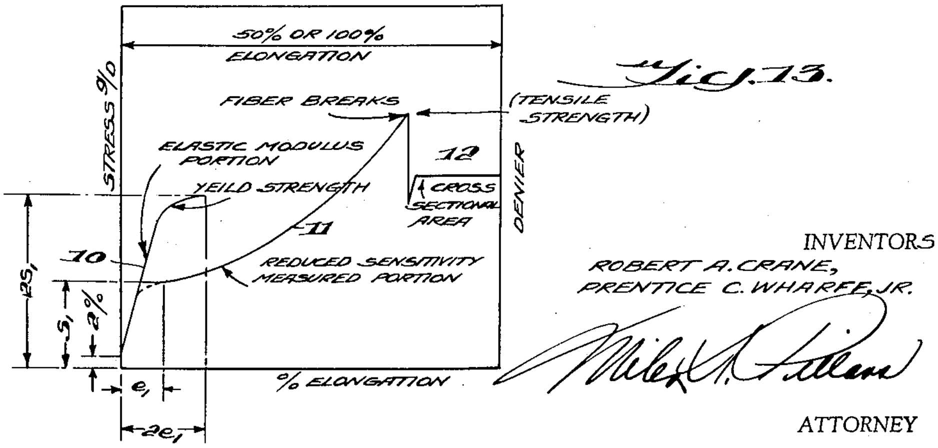
Figure 14:
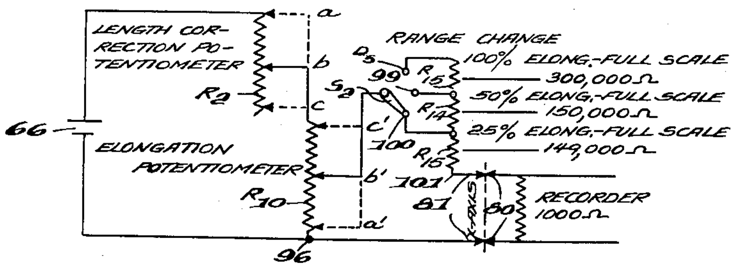
Figure 15:
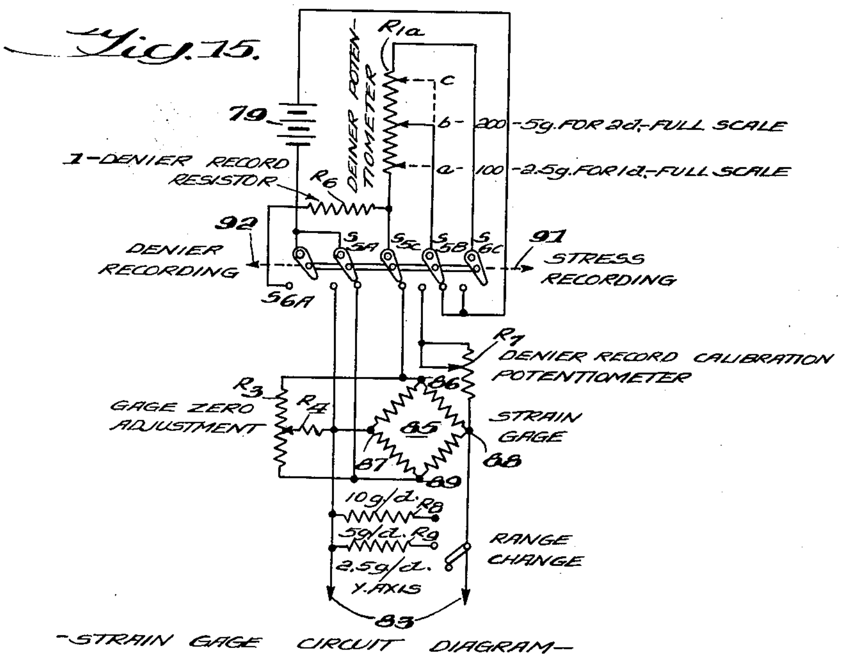
Figures 16, 17:
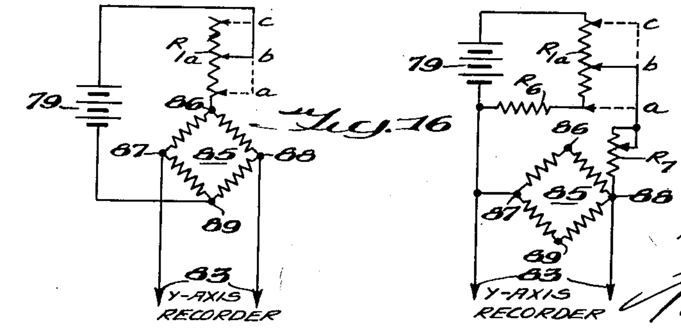
Figure 18:
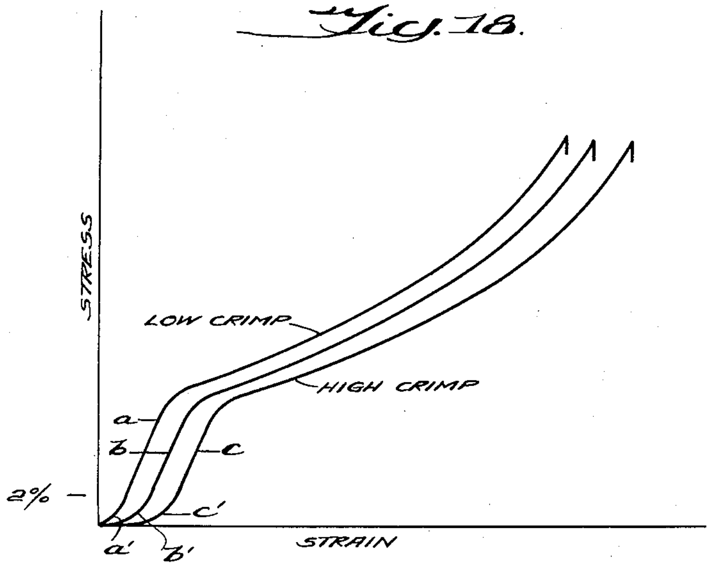
Figure 19:
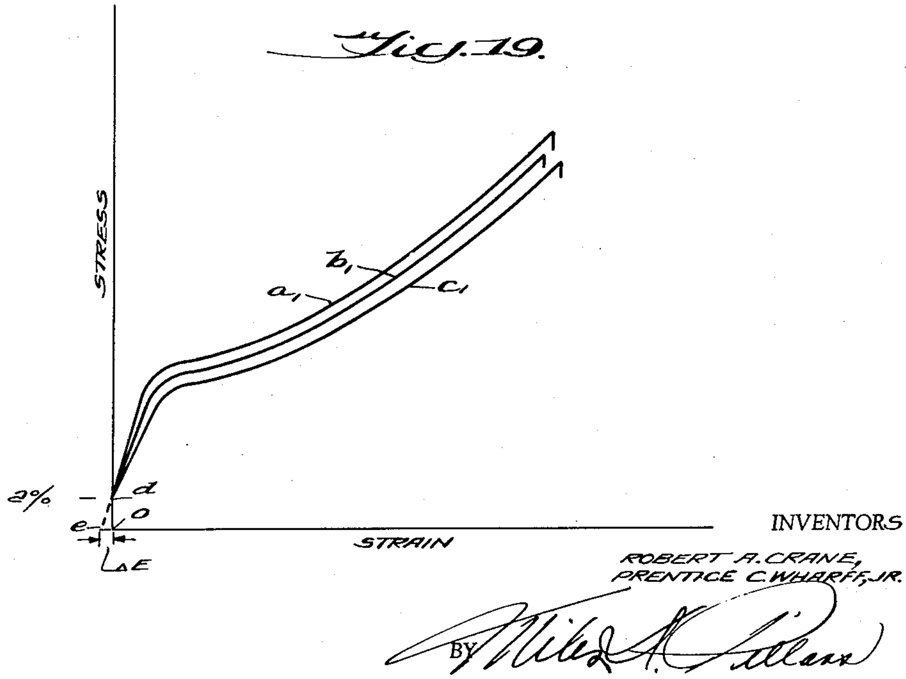

FIG. 3*a* schematically illustrates a part of the major portion of the more essential electrical circuit elements of a tensile tester incorporating the present invention;

FIG. 3*b* illustrates the remainder of the major portion of the circuit diagram partially illustrated in FIG. 3*a*, with circuits continued from FIG. 3*a* to FIG. 3*b* having parts extending between FIGS. 3*a* and 3*b* similarly arranged and spaced in these two figures, so that lines extending to the right hand and left hand margins of FIGS. 3*a* and 3*b*, respectively, are interconected to give a complete operable system;

FIG. 4 is a perspective schematic illustration of the main mechanical operating parts and their interconnected relationship in the tensile tester unit shown in FIGS. 1 and 2, and for which the electrical circuits are shown in FIGS. 3*a* and 3*b*;

FIG. 5 is an enlarged rear elevational view of the extension yoke assembly shown in FIG. 1 and schematically illustrated in FIG. 4;

FIG. 6 is a sectional view, taken along lines 6—6 of FIG. 5, illustrating details of the extension yoke assembly;

FIG. 7 is a perspective view of the extension yoke assembly, shown in FIGS. 5 and 6, mounted in the bearing support member for the yoke and for an end of the main cam shaft and an end of the main drive shaft;

FIG. 8 is an enlarged perspective view of the specimen loading chute and tab holder, with an end of the purging air jet nozzle and a test specimen, showing structural details of these parts of the tester illustrated in the assembly shown in FIG. 1;

FIG. 9 is an enlarged perspective view of a fiber specimen secured to tab holding elements of the type adapted to be used with the tensile tester shown in the other figures of the drawings;

FIG. 10 is a schematic illustration of a suitable conventional X—Y recorder for use with the tensile tester apparatus illustrated in the other figures of the drawings and provided with suitable modifications for incorporation into the complete testing system;

FIG. 11 is a cam development diagram illustrating the required cam displacement for providing predetermined cyclic operating characteristics to the speciment tensioning member of which the extension yoke assembly shown in FIGS. 5, 6, and 7 forms the major structural member;

FIG. 12 illustrates the main operating cam for providing the desired cyclic operation of the extension yoke specimen tensioning member made in accordance with the FIG. 11 diagram;

FIG. 13 illustrates a typical stress-strain curve plotted with dual range sensitivity by a recorder of the type shown in FIGS. 3*a* and 10 in response to test indications provided by the remainder of the tensile tester system;

FIG. 14 schematically illustrates the main elements of the elongation measuring and indicating circuit contained in the system shown in FIGS. 3*a* and 3*b*;

FIG. 15 schematically illustrates the major elements of the strain gage circuit contained in the system shown in FIGS. 3*a* and 3*b* for measuring and indicating stress of a specimen undergoing tests and for indicating the pre-stressed cross-sectional area of a test specimen;

FIG. 16 schematically illustrates as a simplified circuit of the strain gage diagram shown in FIG. 15, the circuits thereof connected for measuring and indicating stress;

FIG. 17 schematically illustrates, as a simplified circuit of the strain gage diagram shown in FIG. 15, the circuits thereof connected for indicating the cross-sectional area of a test specimen fiber;

FIG. 18 illustrates stress-strain curves for fibers of different crimp as recorded by a tensile tester of the type illustrated in FIGS. 1–17 when the tester is manually controlled at the start of this operation to provide an indication and record of the stress-strain relationship throughout a test without any pre-stressing of the test specimen; and FIG. 19 illustrates stress-strain curves similar to those of FIG. 18 and recorded from indications obtained by the fully automatic operation of the tensile tester shown in FIGS. 1–17 in which the test speciments are given a two percent pre-stress, prior to initiation of stress-strain indications and recordings by the tensile tester system.

Tensile testers are useful in determining tensile characteristics of various types of materials which may be used for innumerable tasks from a rubber band or a fiber used in the production of fabric and clothing to metallic elements which may be used for various purposes from musical instruments to large structural beams and tie members. All such structural elements have certain fundamental characteristics which have become recognized in the various trades as indicative of various qualities of the elements and the materials of which they are composed. The most important of the tensile physical properties are those which are generally illustrated by a stress-strain curve which may be determined by suitable tensile tests.

In the past, the testing of single fiber or filament specimens has been undertaken primarily as a matter of academic interest. This was due to several reasons, among which is the fact that until recent years the importance of the tensile properties of fibers used in the manufacture of fabrics was not considered of such great importance. In most instances the fibers were natural products obtainable from natural sources, such as wool, cotton, flax, etc., over the production of which little control could be exercised. With the advent of synthetic fibers known to possess superior tensile properties, it has become important to the fiber manufacturer to be able to determine tensile properties on a regular production basis to provide for quality control of the manufactured fibers and has become important to the textile manufacturer to be able to specify the physical properties of fibers to assure the quality of the materials used in the textile products which he manufactures. The properties of single fibers or filaments have therefore become the common ground between the fiber and textile manufacturers, and, consequently, a ready and reliable system for determining the tensile properties of single fibers has become very important. The delicate nature of single fiber specimens and the general lack of adequate equipment for testing single fibers has, however, caused a lag in the general acceptance of such tests for routine production quality control or for textile manufacturer specifications.

All production quality tests require that a large number of representative samples be tested in the shortest possible time, and that the results of a test be quickly and reliably made available as a record for use in regulating the production under consideration, and for future reference regarding the material tested. It therefore is necessary that a tensile tester for production use be capable of reproducing similar tests reliably and rapidly, with a minimum of supervision and operating skill and indicate or preferably record the physical properties determined by the tensile test. This information can best be indicated and recorded as a stress-strain curve which may be produced by any suitable conventional X—Y recorder adapted to the present tensile tester system. Such stress-strain curves can be recorded for a large number of single fibers on a single sheet, so as to provide a ready comparison of the characteristics of the fibers being produced. Any decided variation from the average or definite trend away from the average will then be readily discernable, so that a correction may be applied to the fiber production process to correct the undesirable variation or trend.

Furthermore, such stress-strain curves provide certain definite useful information for regulating the manufacture of the fibers and for determining their usefulness in various types of materials, such as textiles and thread. A sample stress-strain curve of a single fiber tested by a tensile tester incorporating the present invention is illustrated in FIG. 13 and other sample stress-strain curves also obtainable by such a tensile tester under different operating conditions are illustrated in FIGS. 18 and 19. Such stress-strain curves readily yield important information by an inspection of the curves. Among these important physical characteristics is the well-known Young's modulus, also known as the modulus of elasticity or elastic modulus, which is represented in such a curve by a substantially straight line portion wherein a unit stress per unit cross-sectional area produces a predetermined deformation per unit length of the specimen which may be expressed as a percentage elongation of the specimen in a tensile test or a percentage reduction in a compression test. This elastic modulus also represents the stress, below a given value, which will produce a definite deformation of a specimen from which deformation the specimen will return to its original dimensions when the stress is removed without any permanent deformation thereof.

This elastic characteristic of materials occurs at stresses below a value known as the yield point or yield strength of the material, which generally appears as a definite knee or bend in the stress-strain curve, as indicated in FIG. 13. Stress beyond this point will cause permanent deformation of the member, although it may not be sufficient to cause a breaking of it. It is customary, therefore, to continue stress-strain tests until the specimen actually breaks, so that its maximum strength under stress can be determined. This maximum strength is known as the tensile strength of the specimen in tensile tests and is indicated by a final sharp break in the stress-strain curve. In many instances, the curve between the terminal points marked by the yield point and the tensile strength or break point is not as important as the elastic modulus and the two terminal points, so that the curve between these two points can be recorded at a lower sensitivity than the part before the yield point. This is indicated by the two curves 10 and 11 in FIG. 13. As there shown, the coordinates for curve 10, the high sensitivity curve, have been chosen as twice those for curve 11, the reduced sensitivity curve. Thus, the reading of the yield strength $2S_1$ and the percentage elongation $2e_1$ of curve 10 are twice the values $S_1$ and $e_1$ of curve 11. Also as shown in this figure, the yield strength often is taken to be the point where the curve shows a definite pronounced increase in percentage elongation per unit stress, shown at the stress values $2S_1$ and $S_1$. Once the average yield strength of certain types of specimens is known, it is desirable that the equipment be set to indicate and record at high sensitivity the elastic modulus of the specimen to slightly higher than the average yield strength and automatically to shift the stress-strain measurement indications and recordations to a reduced sensitivity above such predetermined change-over point. The present invention includes this feature in the improved tensile tester, together with provision for indicating and recording the entire stress-strain test on the same scale, and provides for a plurality of scales which can be chosen and set manually for any given test. Furthermore, it is desirable that the cross-sectional area of the test specimen for each test be recorded, and provision, in the improved tensile tester, is made for plotting this value on the same sheet as the stress-strain curve, after a test specimen breaks, as shown at 12 in FIG. 13.

The design of any tensile tester must therefore be predicated upon a knowledge of the general range of quantities which the characteristics of materials to be tested may possess. The embodiment of the present invention which is illustrated in the drawings represents a tensile tester, especially useful for determining tensile characteristics of fine fibers and filaments. The general structural arrangements and control and indicating circuits can equally well be utilized for testing specimens having greater size and generally possessing characteristics wherein the stress and elongation may be many times those of small fibers and filaments. The present description and reference to the drawings will generally be limited to terminology applicable to the tensile tester shown, and such description is to be taken only as illustrative of the application of the present invention. Ideally, an instrument of the type to which the present invention pertains may be constructed to accomplish all of the tests desired and be optimally designed around the generally known characteristics and requirements of the materials to be tested, such as fine fibers, taking into consideration also the size of the specimens, the rapidity with which tests should be made, the skill of the operators of the test equipment, the resultant needs for restoring the equipment to test starting conditions after each test, and of the specimen handling and loading techniques.

The design of such a tensile tester therefore requires a consideration of several important factors, including the characteristics of the specimens to be tested and the equipment needed to provide the desired operating characteristics. These operating characteristics require that the equipment provide a smooth continuous mechanical drive throughout a test, without jerkiness or backlash and without any sudden or abrupt changes in stress, such as possible momentary reversals in the direction of drive, even when the sensitivity of the instrument may be varied as much as 50% in shifting from a high sensitivity to a reduced sensitivity operation. This is particularly important in testing fine fibers, as any relaxation of the stress on the fiber or any jerk during the extension of a specimen may break the specimen and, in any case, would result in an unusable curve. These limitations therefore impose definite design requirements on the mechanical system as well as the source of driving power. Furthermore, it imposes definite restrictions upon the control system. In the present embodiment of the invention the driving power and the control system are provided by electrical devices and circuits, and the ultimate drive is provided by a specially designed mechanical system.

The results and information obtained by the tensile tester must be made available as definite information which can be interpreted in terms of the characteristics of the tested specimens. In the present embodiment this information is relayed through an electrical system which provides indications of the various results by electrical signals which are automatically modified and corrected to give control signals to a suitable indicating device or recorder which provides for a visual inspection of the test results.

The illustrated embodiment of the present invention may readily be built into two or three separable main units. This not only facilitates the operation and checking of the separate interconnected units comprising the complete test system, but also facilitates the use of suitably modified conventional test units for the terminal stages of the test system. The major operating and control portions of the tensile tester can best be incorporated in a single casing, as shown in FIGS. 1 and 2. These figures illustrate the actual relative arrangement of certain of the more important parts of the mechanical driving system which are more completely illustrated schematically in FIG. 4. This mechanical system includes a high speed and a low speed source of driving power, interconnected by suitable clutches and gearing and controlled by interrelated switching cams, a main drive shaft, an elongation drive cam, an elongation yoke assembly with two drive assemblies which control and provide indications of the elongation and length correction of test specimens, all mounted in a suitable frame and casing for supporting the equipment and test specimens, and an arrangement for automatically restoring the system to zero or starting condition and cleaning the test equipment of broken specimens after each test.

In order to test fine fibers and filaments and provide for a ready comparison of test results, it is desirable that the dimensions, such as the cross-sectional area and the length of the fiber specimens, be substantially constant for all comparable tests, so that the mechanical and electrical systems can be designed to provide indications of elongation or strain of the fibers in terms of a unit area and unit or constant gage length. For any given material having a definite density, the measurement of the size of the fiber in terms of deniers provides a definite measurement of the cross-sectional area of the specimen fiber, although the denier of the fiber under consideration technically is a measurement of the weight of the fiber for a predetermined length. Artisans in the field of fibers, filaments, fabrics, and similar materials, generally refer to the denier of a material in order to indicate the size thereof, and in view of this generally accepted terminology, the term denier is used interchangeably with the term cross-sectional area in the present disclosure to designate the size of specimen fibers or filaments. It also has been found that more reliable comparative tests can be made where the strain is automatically corrected for length variations, and this strain is best expressed or indicated directly as a percentage elongation of the test specimen. It is very important, therefore, that test samples be firmly secured to the tensioning elements in order to provide an accurate indication of the elongation thereof in terms of unit length or percentage.

FIG. 9 illustrates a convenient mode of attaching individual fibers to holding elements for use in connection with the present tensile tester. In this arrangement, a single fiber 13 first has one end thereof cemented by any suitable material 14 to a holding element in the form of a tab 15 to provide a rigid and nonyieldable point of attachment of the fiber 13 to the tensile tester when the tab 15 is inserted in holding position therein. The tab 15 may be formed of any suitable material, such as ethyl cellulose, although any similar material can be utilized for this purpose. The fiber 13 then is extended to a predetermined length, for example one inch, without stressing it, and then is cemented as at 14' to a tab 15', similar in every respect to the tab 15. This provides a substantially uniform length of fiber extending between two similar holding tabs. The tabs 15 and 15' preferably also are formed with apertures 16 and 16' extending therethrough, substantially along the longitudinal center line of each tab, so that the tabs may conveniently be hung or secured to pins on tensioning elements of the tensile tester if desired.

In order to facilitate rapid and accurate loading of specimens on the tensile tester while minimizing the possibility of damage to the specimen fibers, a tab holder and loading chute is provided, as illustrated in FIGS. 1 and 8. This loading chute includes a pair of downwardly sloping guide elements 17 closely spaced apart along a center line aligned with the center of a tab holder 18 and preferably formed with outturned portions which provide smooth rounded edges 17' along the spacing slot between the elements 17. As is more clearly shown in FIG. 8, a tab is merely placed above the chute with the fiber 13 extending downwardly therefrom in the slot between the edges 17' of the guide elements 17 and released in this position. The weight of the lower tab secured to the fiber 13 is sufficient to pull the upper tab downwardly against the upper surfaces of the guide elements 17, which causes the upper tab to slide downwardly, carrying with it the fiber 13 until the tab rests upon two lower sides 19 of the tab holder, centered between upwardly extending sides 20. The chute and the tab holder preferably are formed as a unit which is secured to the tester frame structure 21 by a pivot or swivel pin 22. This swivel connection of the tab holder to the tensile tester frame assures a proper alignment of the tab and fiber undergoing test, without the introduction of undesirable twisting forces on the specimen fiber, and also facilitates removal of tabs and fibers from the tab holder after the completion of a test.

In order to make the testing operation substantially completely automatic and to assure a complete purging of the tester of all previously tested specimens, a low pressure jet of air is adapted to be projected against the back of the upper tab after the completion of each test, so as to blow this tab and its associated end of fiber out of the tab holder 18. This can conveniently be done by providing an air jet nozzle 23 aligned with an opening 24 formed in the back of the tab holder 18 and providing for a suitable control of the air supply to the nozzle 23 sequentially in response to the final step in the testing procedure after the specimen fiber 13 has been broken. The sequential control of this feature will be explained in detail in connection with the operation of the tester control system.

In order to provide for tensioning a specimen fiber 13, the lower tab 15' which is freely suspended by the fiber 13 should be gripped securely to prevent slippage or similar extraneous movement after the test of the fiber 13 has begun, and, in a fully automatic test, the tension must be applied to the fiber 13 smoothly and without a sudden initial application of force. In order to provide these properties in the test procedure, an extension yoke assembly with a specially designed driving arrangement is provided.

This extension yoke assembly is illustrated in detail in FIGS. 5, 6, and 7, and comprises a tab gripping and holding element 25 which is securely fastened in any suitable manner, as by a screw 26 to a base 27 against a shoulder 28 thereon. This holding element is provided with a pair of tab gripping claws 29, which are separated by a narrow slot 30 substantially along the longitudinal center line of the tab holding element 25, through which the specimen fiber is adapted to extend out of engagement with the sides of the claws. The base 27 is mounted on a drawbar 31, which is suitably secured at its upper end in a socket formed substantially centrally in a bracket 32 and secured by a set screw 33. In order to assure complete freedom of movement to the tab holding element 25 when it is exerting tension on a specimen fiber, the bracket 32 is mounted on a pair of parallel guidebars 34, which are supported in bearings mounted in a bearing block 35 suitably secured to the tensile tester frame structure 21. A second bracket 36 is secured to the upper ends of the guidebars 34 in order to assure alignment of the guidebars and to minimize possible binding of these bars during testing operations. In order further to assure proper alignment of the guidebars and to minimize the possibility of binding of these bars, one of the bars is securely fastened at both ends thereof by setscrews 37 to the brackets 32 and 36, while the other guidebar is formed with a pair of annular grooves at each end thereof spaced apart substantially the width of the respective brackets through which the ends of the bar extend. Clamping rings 38 of the true-arc type are secured in the grooves in the ends of the guidebar and provide bearing surfaces for aligning the intermediate portion of the bar in slots 32' and 36' in the brackets 32 and 36, respectively. This mounting provides for a limited amount of movement between the bar and the brackets in the slots 32' and 36' and prevents the setting up of binding forces which might arise due to any slight misalignment between the guidebars 34 or between these guidebars and the bearing block 35. A tension spring 39, FIG. 1, is arranged on each side of the bearing block 35 and is secured under tension to a pin 40 mounted on the bearing block 35 and a pin 41 mounted on each side of the lower bracket 32. This provides a balanced tensioning force on each side of the bracket 32 which draws this bracket upwardly towards the bearing block 35 and tends to hold the tab holding element 25 in its upper position.

In order to exert tension on a specimen fiber 13, the tab holding element 25 is adapted to be driven in accordance with predetermined longitudinal displacement, speed, and force characteristics. This type of operation can best be provided by driving the drawbar through a precision elongation cam 42 at predetermined speeds in response to certian desired test functions. Such a cam is formed with a cam surface made in accordance with certain predetermined speed and displacement requirements of the test cycle. Details of a suitable cam are shown in FIG. 12, and its cam surface development displacement diagram is illustrated in FIG. 11.

Such a precision cam is preferred for driving the extension yoke because it allows the mechanical system of the tensile tester to be driven continuously in one direction of rotation, without reversals, and thus eliminates the possibility of lost motion resulting from backlash inherent in all reversible drives. Furthermore, such a cam can be designed so as to permit a very accurate control of the acceleration imparted to its cam follower and also to eliminate all jerkiness from the cam follower travel. This is very important where the strain gage which is utilized with such a tensile tester is of a conventional unbonded resistance wire type. It also is highly essential that all jerkiness of the extension yoke be eliminated so that the true tensile characteristics of the specimen fiber 13 will be reflected in the test results, and so that all variations recorded in the stress-strain curve will be the result of tensile characteristics and not reflections of irregularities in the operation of the extension yoke.

Referring particularly to FIGS. 11 and 12, the cam surface of the elongation cam 42 is at its minimum radial displacement at the zero extension point for the extension yoke. This is the point corresponding to the fully retracted position of the extension yoke and is represented at $a$ in FIGS. 11 and 12. The cam is adapted to rotate in a direction as indicated by the arrow in FIG. 12 and the cam surface is adapted to press against a roller cam follower 43 rotatably mounted on a pin 44 supported by a bracket 45 on the lower drawbar bracket 32. The tension springs 39 maintain the follower 43 in tight engagement with the cam surface of the cam 42, so that rotation of the cam tends to bias the cam follower 43 against the tension of the springs 39 downwardly away from the bearing block 35 and consequently away from the upper tab holder 18.

Under normal operating conditions the zero position of the tab holding elements 25 is its fully upwardly retracted position. Since any test specimen has a definite length and extends freely below the lower edge of the tab holder 18 for a predetermined distance, it is desirable that the tab holding element 25 which exerts the tensile force upon the specimen should move relatively rapidly from its fully retracted or zero position to a position just short of the normal or predetermined gage length of the test specimen, that is, just short of a physical engagement with the lower tab. For example, where the gage length is standardized at one inch, the rapid advance of the lower tab holding element 25 could extend from its zero position to substantially $\frac{1}{10}$ inch above the upper edge of the lower tab holder 25. This would place the lower edge 29' of the claws 29 almost in engagement with the upper edge of the lower tab 15'.

In order to obtain this rapid advance of the tensioning tab holding element 25, the elongation cam 42 is provided with a cam surface having a rapidly increasing slope, as indicated by the portion of the cam displacement diagram between the point $a$ and the point $b$. The cam surface represented by this portion of the curve will accelerate the follower 43, and consequently the drawbar and tensioning tab holding element 25, from standstill at point $a$ to a predetermined desirable operating speed, as indicated by the slope of the curve at point $b$. It has been found that this distance preferably should be traversed in about 45° of rotational movement of the elongation cam 42 to provide a smooth gradual acceleration in a minimum of time. This is indicated in FIGS. 11 and 12 by $\beta_1$.

For any given starting gage length of test specimens, the drawbar 31 should be extended in the zero position of the tensioning tab holding element 25 to place the upper ends of the undersides 29' of the claws 29 on the tab holding element 25 a distance above the top of the lower tab 15' corresponding to the distance $x$ in the cam displacement diagram shown in FIG. 11. This distance can readily be adjusted by shifting the drawbar 31 longitudinally of its mounting in the bracket 32 and securing it at the proper distance by the set screw 33. Such a positioning of the drawbar 31 and the lower tab holding element 25 assures a free positioning of the lower tab 15' prior to its engagement by the holding element 25 and permits the specimen fiber 13 freely to pass through the slot 30 so as to locate the tab 15′ in position under the claws 29.

The initial rotation of the elongation cam through the angle $\beta_1$ preferably is performed at a relatively high speed, after which the speed of the cam is substantially reduced in order to avoid possible shocks to the specimen fiber when the claws 29 initially engage the lower tab 15′. For most specimen fibers the initial engagement of the claws 29 with the upper surface of the lower tab 15′ will not exert any substantial stress upon the specimen fiber, as most fibers inherently are formed with a certain amount of crimp or curvature which must first be stretched out before the specimen fiber is placed under tension. This normal nontensioning elongation of the fiber provides a cushioning for the initial stress placed upon the fiber and permits the elongation cam to be designed with a cam surface having a substantially straight line constant speed displacement development for all of its tensioning operating range, as indicated by the portion of the curve in FIG. 11 between the points *b* and *c*. This constant speed portion of the cam when developed into an operating cam surface is a cycloid, as shown by the cam surface from the point *b* to the point *c* in FIG. 12, and preferably is a hypocycloid with the point of origin at *b* on a base circle of the radius of the cam at this point which continues as indicated for 180° until the radius of the cam surface at point *c* is substantially twice the radius at point *b*.

This constant speed operation of the drawbar and tensioning tab holder 25 is adapted to provide all of the extension of the tensile tester for the useful operation of the tester in obtaining the stress-strain characteristics of the specimen under test and equals the extension of the drawbar and tensioning tab holder 15′ represented by the distance *y* in FIG. 11. Preferably, this cycloidal cam surface should extend through about 180° of rotation of the elongation cam 42, as indicated by the angles $\beta_2$ in FIGS. 11 and 12. For normal stress-strain tests the specimen should pass through its yield point and eventually break prior to the completion of the $\beta_2$ portion of a cycle of cam operation. The remainder of the cam surface extending from the point *c* to the zero point *a*, FIG. 12, merely represents the yoke recovery or return portion of the cycle of operation and serves no specific purpose other than to reposition the extension yoke at its zero or starting point. No linear motion is, therefore, required, as movement of the yoke during this portion of the cycle of operation produces no tension on a test specimen.

During this portion of the cam rotation it is required that the extension yoke be brought to a standstill from its downward movement and be reversed in direction under the action of the tension springs 39. This reduction in the downward movement of the extension yoke can best be produced by a rapid reduction in the speed of advance, as indicated by the angle $\beta_3$ curve portion between points *c* and *d*, FIG. 11, after which a short dwell period $\beta_4$, between points *d* and *e*, is desirable prior to the provision of a reverse curvature in the cam operating surface for full retraction of the extension yoke.

As shown in FIG. 11, these yoke recovery portions of the cam operating surfaces have been found to be adequately obtainable by a 45° rotation for decelerating the downward movement of the yoke, followed by a 10° dwell portion, and concluding with an 80° return portion. Smooth cycloidic curves are preferred for interconnecting the increasing and decreasing radii portions of the cam surface, as these will eliminate jerkiness in the operation of the device and thereby minimize wear of its operating parts. Thus, it is seen that a cam drive for the tensioning member of the apparatus by a cam of the type shown in FIG. 12 provides all of the most desirable smooth test operating characteristics, together with a smooth return of the tensioning drive to its zero or starting position without the need of any reversal of the direction of operation of the driving mechanism, thereby minimizing control of this operation as a direct result of the inherent characteristics of the cam drive. A suitable gear and rack drive in place of the cam and follower drive can readily be utilized, although for the small forces involved in single fiber tensile testing, the cam drive has been found very practical and adequate.

In order to provide the desired driving power to the elongation cam 42, suitable electric motors, gears, and clutches are interconnected to a main cam drive shaft 46 and are adapted to be connected and disconnected by a series of suitably actuated switches which electrically energize and deenergize circuits for controlling the operation of the motors and electromagnetic clutches to obtain the required cam operating speeds. These also serve together with other suitably phased switches to control the indicating and recording of the stress-strain characteristics determined during each tensile test. In addition, suitable brakes are provided for definitely repositioning the equipment in its starting or zero position at the end of each test, and for holding it in this position until the start of a new test. These elements of the system serve to provide the proper phasing and indexing of the operational sequence desired for continuous smooth operation during each tensile test.

The basic driving elements are schematically illustrated in FIG. 4, while the actual physical arrangement of the major components thereof are shown in FIGS. 1 and 2. The schematic relationship of the drives to the indicating and recording portions the system are illustrated in FIGS. 3*a* and 3*b*. In order properly to correlate the relationship of the mechanical tensioning equipment and its sources of mechanical power to the driving control and test result measuring systems, reference should be made to all of these figures.

The desired high speed operation of the elongation cam is provided by a suitable high speed motor 47 having a drive shaft 48 and a drive gear 49 mounted thereon. The drive gear 49 has a permanent driving engagement with a gear 50 mechanically coupled to one of the driving members 51 of an electromagnetic high speed clutch 52. The other driving 53 of the high speed clutch 52 is permanently mechanically coupled to a clutch countershaft 54, which is directly mechanically drivingly connected to the main cam drive shaft 46 through a pair of suitable gears 55 and 56. These details are more clearly shown in FIG. 4, and in order to simplify the schematic representations in the control circuit diagrams of FIGS. 3*a* and 3*b*, the intermediate mechanical coupling of the electromagnetic clutch member 53 to the main cam drive shaft 46 has been eliminated and this clutch member 53 is shown as directly mechanically mounted on the cam drive shaft 46 in these figures. Since the clutch member 53 has a permanent mechanical driving connection with the cam drive shaft 46, this schematic representation accurately portrays this feature of the mechanical system. With such an arrangement, the elongation cam drive shaft 46 will be driven at a relatively high speed by the high speed motor 47 whenever the high speed electromagnetic clutch 52 is energized and will be mechanically uncoupled from the high speed motor 47 when the high speed clutch 52 is electrically deenergized.

In order to provide the desired low speed operation of the elongation cam and its associated tensioning equipment for the actual tensile testing of specimens, the elongation cam shaft 46 is adapted to be driven at a relatively low speed from a suitable source of low speed power comprising a low speed electric motor 57 having a drive shaft 58 directly mechanically coupled to a drive gear 59. This low speed drive gear 59 is permanently mechanically drivingly engaged with a gear 60 mounted on a low speed countershaft 61 on which a worm gear 62 is drivingly mounted. The worm gear 62 is permanently drivingly engaged with a driven gear 63, and the gearing train 59—60—62—63 provides a suitable reduction gearing drive between the low speed motor 57 and a drive shaft 64 of a suitable overriding clutch 65. This overriding clutch 65 is adapted to provide a relatively low speed drive to the elongation cam 42 through its shaft 46 and the gearing 55—56 connected to the clutch countershaft 54 under conditions when the high speed clutch 52 is deenergized and the low speed driving motor 57 is energized.

With such an arrangement, whenever the high speed motor 47 and high speed clutch 52 are energized, the elongation cam drive will be directly from the high speed motor through the high speed clutch, and the driving connection of the clutch countershaft 54 will be mechanically uncoupled from the low speed driving equipment through the slip action of the overriding clutch 65. This type of dual high and low speed drive for the elongation cam shaft 46 provides a smooth transition from high to low speed operation and vice versa, as the deenergization of the high speed clutch and the high speed motor does not stop the rotation of the cam drive but merely shifts its drive from a high speed condition through the high speed clutch to a low speed drive condition through the mechanical coupling of the overriding clutch 65. This further assures a smooth operation of the elongation cam with a minimum of transitional speed variations in changing from low speed operation to high speed operation by a simple electrical energization of the high speed motor and clutch, without stopping the low speed driving mechanism. The proper operational sequence for transferring the drive of the elongation cam shaft 46 from high to low speed and back to high speed operation is obtained by suitable electrical switches and control circuits responsive to various predetermined test and operating conditions of the equipment.

According to the present invention, the illustrated embodiment may be operated as a fully automatic tensile tester which only requires that a test specimen be inserted in the proper place on the apparatus and that the testing operation be started, after which all further operational control is fully automatic to provide a complete indication of the elastic modulus stress-strain relationship of the test specimen, its yield strength, percent elongation, and tensile strength, and to record these values automatically with a final recordation of the size of each test specimen. The various stress-strain relationships can conveniently be obtained as electrical signals proportional to the stress and strain on the test specimen, and a very reliable, simple, and relatively rugged electrical system is provided by the utilization of suitably phased and indexed microswitches responsive to the occurrence of various test and operational conditions, together with potentiometers and resistances which are varied in accordance with well-known electrical principles for dividing electrical voltages or indicating voltage relationships proportional to the resistances involved. Furthermore, the illustrated embodiment of this invention utilizes reliable well-known stepping switches and multi-position switches and relays for further automatically obtaining certain sequential operations of the test and to provide for utilization of the test system and apparatus for performing various tests and for indicating the results of similar tests with varying degrees of sensitivity or with combined degrees of sensitivity for different portions of a single test. The choice of the sensitivity and of the response of the apparatus can be chosen and preset at will by the operator. Furthermore, various simple checks are adapted to be made to assure the accuracy of the indications and recordings of the test results.

In testing fine fibers and similar filaments it will be found to be practically impossible to maintain the gage lengths of test specimen fibers 13 at an exactly uniform gage length between attachment to the filament holding tabs 15 and 15′. The distance between the tabs 15 and 15′ defines the gage length in a general manner, but the variations occurring between different specimens and between the manner in which different specimens are cemented to the tabs, make it impossible to rely strictly upon the spacing between tabs as a measure of gage length. A direct measurement of the elongation of various test specimens therefore would not give a correct indication of the true nature of the elongation in terms of strain. It is important, therefore, that provision be made to measure both the original length of each test specimen and the elongation thereof under stress, and to correlate these so that an indication can be obtained of the elongation per unit of length as a true measure of the strain or percentage elongation of the test specimen. Both of these measurements are directly indicated by the position of the tensioning tab holders 25, so that the position thereof can be utilized as a direct indication of the length and elongation of a test specimen.

This position of the tensioning tab holder 25 bears a direct relationship to the rotation or angular position of the elongation cam 42, so that this position of the elongation cam 42 can be utilized to indicate length and elongation characteristics of test specimens. By direct measurement of the distance of the underside 29′ of the claws 29 on the tensioning tab holser 25 from the inner surface of the lower side 19 of the upper tab holder 18 at the zero or starting position of the cam 42, this initial or zero position length can be definitely determined. For a standard set of tests this zero position length can be standardized at a fixed value, such as 9/10 inch, and a voltage can be impressed across an indicating or recording instrument proportional to this standard length. Such a voltage is represented in FIG. 3*b* as a voltage across an elongation circuit battery 66, or other suitable source of direct current, which is adapted to be connected across a potentiometer $R_{10}$ for measuring the actual elongation of a test specimen. The potentiometer $R_{10}$ is connected in series with another potentiometer $R_2$ for measuring the variation of the test specimen from standard gage length, so as to correct strain measurements in accordance with the true length of the test specimen. These two potentiometers in series are utilized to provide a voltage across a suitable indicating or recording instrument, which voltage will indicate the actual percentage elongation of the test specimen.

In order to impress this potentiometer voltage upon the indicating or recording instrument, a manually operable test selector switch $S_1$ is provided, which has several sections, the more important of which are indicated in FIG. 3*b* as sections A, B, D, E, F, G, H, and I, each provided with a zero position contact and five other contact positions. These selector switch contacts are adapted to be electrically contacted by contactor arms simultaneously operable to each of the six positions of each section of the manually operable switch $S_1$ to provide various manually selectable operating circuits. This switch is shown in its zero position in FIG. 3*b*, with all of the circuits connected to the various sections of the switch open circuited.

For illustrative purposes, the present invention is shown as connected to a suitable conventional X—Y recorder 67, similar to that illustrated and described in Patents 2,464,708 and 2,835,858, Moseley. Such recording instruments also are illustrated and described in a publication by the L. F. Moseley Company in a manual entitled "Autograf X—Y Recorder." Any other suitable X—Y recorder can be utilized, and these examples are given purely for illustrative purposes.

All such recorders are provided with certain basic circuits which are indicated in general in the recorder 67 shown in FIG. 10. These recorders all include a pen 68 of any suitable type for drawing a curve on coordinate graph paper. The pen 68 is adapted to be moved relative to the coordinate paper in two different directions, generally indicated as the X and Y coordinate axes of the paper. In certain instances, the paper may be held stationary and the pen moved relatively in both directions. In other types of X—Y recorders, such as those previously referred to, the coordinate paper is attached to a roll 69 which is driven by a suitable servomotor 70 in response to signals or indications received from an external source. This rotation of the paper on the roll 69 will produce relative movement of the pen 68 to move in the direction of the Y-axis of the paper.

Control of the servomotor 70 in the recorder 67 is effected through any suitable drive control system for amplifying Y-axis signals and energizing this servomotor in response to such signals. This Y-axis drive control circuit does not per se form a part of the present invention and is indicated in FIG. 10 at 71.

The recorder pen 68 is adapted to move longitudinally of the roll 69 in response to actuation by a servomotor 72, suitably connected through a drum 73 and a driving cable 74. This actuation of the pen 68 produces a lateral displacement of the pen along the X-axis of the coordinate paper on the roll 69, so that the resulting curve scribed on coordinate paper on the roll 69 bears a definite relationship to the X and Y axes of the coordinate paper responsive to the relative movement between the roll 69 and the pen 68. Such actuation of the pen 68 is adapted to be controlled in response to signals received from an external source which are suitably amplified through an X-axis servometer drive control 75 for controlling and energizing the X-axis servometer 72.

Under certain conditions, it is desirable to stop the recording or scribing of the pen 68 upon the coordinate paper on the roll 69, as when changing from a scale of one sensitivity to a scale of higher or lower sensitivity, and such cessation of the scribing or recording can readily be obtained by mounting the pen 68 in such a manner that it can be readily lifted out of contact with the coordinate paper, and similarly readily returned into scribing contact therewith. This is schematically illustrated in FIG. 10 by a pivotal mounting of the pen 68 on a supporting frame 76 which is adapted to be pivoted upwardly by any suitable actuator, such as an electromagnetic solenoid pen lifting device 77, for raising the pen 68 away from the roll 69 when the pen lift solenoid 77 is energized and to return it into scribing contact with the roll 69 on de-energization of the pen lift solenoid 77. The pen lift solenoid operation also properly can be provided with suitable controls 78 of a conventional type, which do not specifically form a part of the present invention, and which may be operated in response to signals received from the tensile tester system. In this manner the point of contact of the pen 68 on coordinate paper wrapped around the roll 69 will at all times be determined in one direction by the lateral displacement of the pen 68 longitudinally of the roll 69 and in the other direction by the angular position or displacement of the roll 69 around its axis of rotation.

It is desirable that a check of the recorder can readily be made for its operation with the specific test signals which are to be utilized for controlling the operation of the recorder. Such a check or calibration of the recorder is adapted to be made with the tensile tester embodiment shown in FIGS. 3*a* and 3*b* by connecting sources of voltage which are adapted to provide the signals for energizing the circuits controlling the X and Y axis displacements of the recorder operatively across the X and Y axis drive controls 75 and 71, with the remainder of the tensile tester circuits in zero or start positions.

In conventional stress-strain diagrams, the strain of a test specimen usually is indicated along the X axis of a graph, and the stress usually is indicated along the Y axis of such a graph. In order to facilitate checking and comparing the results of tensile tests made by the present testing equipment, the conventional stress-strain relations will be utilized in the curves plotted by the recorder 67, that is, strain will be indicated along the X axis of such curves, and stress will be indicated along the Y axis of the curves. It is desirable, therefore, that the voltage which is utilized to indicate the strain or percent elongation of a test specimen, should be impressed upon the X axis drive control 75 of the recorder 67, and the source of energization, which in the illustrated embodiment is shown as a suitable strain gage battery 79, should therefore be connected across the Y-axis drive control 71 of the recorder 67 for calibration purposes.

These connections of the batteries 66 and 79 across the recorder drive controls 75 and 71, respectively are provided by placing the manually operable selector switch $S_1$ in position 1 thereof. With the switch $S_1$ in position 1, all of the circuits connected thereto are open-circuited, except those to the batteries 66 and 79 which connect these two batteries across the recorder to allow for a conventional checking or calibrating of the extensions of the pen 68 and the roll 69. This position 1 of the selector switch $S_1$ connects the battery 66 across the X-axis drive control 75 of the recorder through leads 82 therefrom to leads 81, FIG. 3*b*, and the strain gage battery 79 is connected across the Y-axis drive control 71 of the recorder 67 through leads 80 to leads 83, FIG. 3*a*. These lead connections form a definite interconnection of the recorder control to the tensile tester system for all operating purposes. The checking and calibrating of a conventional recording instrument 68 does not form part of the present invention, as it utilizes the standard equipment of all such conventional recorders and is made in accordance with standard practice in this regard.

When the recorder 67 has been properly calibrated and a specimen fiber 13 has been prepared by having the ends thereof cemented to holding tab elements 15 and 15′, an operator can easily and rapidly perform a very reliable tensile test of the specimen fiber. The first step in such a test includes a determination of the size or cross-sectional area of the fiber 13. This can readily be done by any acceptable conventional method, such as placing the fiber 13 in a vibrascope, to determine its denier. After the denier has been determined the specimen is removed from the vibrascope and placed in testing position on the tensile tester. If the tester is provided with a loading chute and tab holder, such as that shown in FIG. 8, the specimen fiber is simply passed between the wing guide elements 17 of the loading chute and the upper tab 15 is dropped over the upper surfaces of these guide elements. The weight of the lower tab 15′ will be sufficient to cause the upper tab 15 to slide downwardly over the guide elements and come to rest upon the lower sides 19 of the upper tab holder 18, with the specimen fiber 13 accurately centered between the sides 20 of the tab holder. If the tensile tester is not provided with such a loading chute and tab holder, but is provided with a simple holding pin or hook 18, such as that schematically illustrated in FIG. 3*a*, the aperture 16 in the tab 15 is simply hung over the end of this pin or hook 18. In either case, the upper tab holding 18 is secured to and supported by a tension bar 84, which is secured to a strain gage 85 of any suitable type, so that the tension on the specimen fiber 13 will be transmitted directly through the tension bar 84 to the strain gage.

Preferably, the strain gage is of the unbonded resistor type, which transmits an electrical signal of an intensity which varies in accordance with the magnitude of the tensile force transmitted to it by the tension bar 84. The internal circuitry of such a gage is essentially a Wheatstone bridge circuit connected between terminals 86, 87, 88, and 89, as shown in FIGS. 3*a*, 15, 16, and 17. Such strain gages operate in accordance with the well-known principle that the resistance of a conductor changes with its elongation, so that a tension placed upon certain terminals of the strain gage will unbalance the Wheatstone bridge. With such a gage 85, energization of the bridge across the terminals 86 and 89 will result in a potential difference between the terminals 87 and 88 proportional to the tension upon the strain gage, and this potential difference can, therefore, be used as an indication or measurement of the tensile force on the specimen 13 secured to the tension bar 84.

This strain gage and its associated circuit provides a means for readily transmitting the indication of the stress on the specimen fiber to an indicating or recording instrument, such as the recorder 67, and acts as a very simple basic force transducer which can be easily adjusted to compensate for variations in the cross-sectional area of the specimen fiber undergoing tests. Furthermore, such a force transducer can also readily be connected in a circuit so as to vary the range or sensitivity of its response by simply shunting the terminals 87 and 88 of the strain gage with suitable resistors. In addition, such a strain gage lends itself readily to connection in a circuit which not only corrects for variations in the cross-sectional area of the specimen fibers, but also can be utilized for providing a direct indication to the recording instrument 67 of the denier or cross-sectional area of the test specimen, by a simple reconnection of the test circuit, preferably as an automatic sequence to the completion of a tensile test.

In order more clearly to visualize the operation of this stress measuring and indicating portion of the complete circuit, FIG. 15 illustrates a simplification of the circuitry shown in FIGS. 3*a* and 3*b*. This circuitry has been found highly desirable, and in fact necessary, in order to obtain highly reliable comparable results when testing single fibers, because of the wide variations, often as much as 10% either way from the average, in the cross-sectional areas between individual fiber filaments. Most tensile test equipment record stress in terms of the actual force applied, rather than in terms of force per unit cross-sectional area. This is usually possible, since the initial or pre-stressed cross-sectional area of relatively larger conventional test specimens can be held within reasonably close limits. In view of the wide variation between production samples of single fibers, stress-strain curves in which the force or stress is plotted in terms of grams vs. elongation would have a 10% scatter on either side of the average due to variations in cross-sectional area alone. This would make it extremely difficult to detect variations due to other factors. It is, therefore, very important that differences in cross-sectional area be eliminated from the effects produced by the strain gage measurement of the stress on the test specimen. This will result in normalizing of the stress-strain curves and provide an accurate expression of the stress on the test speciman in terms of the force per unit cross-sectional area, such as grams per denier. These corrective features all are incorporated in the circuitry of the embodiment of the present invention illustrated in FIGS. 3*a* and 3*b*.

FIG. 15 schematically illustrates a simplification of the circuits shown in FIGS. 3*a* and 3*b* for providing a correct calibration of the strain gage in its operating circuit, together with circuitry for converting the tension from force into force per unit cross-sectional area. This circuitry thereby corrects for variations in the size of test specimens and gives direct indications by electrical signals for recording the stress on a test specimen. It also is connected in a circuit which sequentially provides an indication by an electrical signal of the cross-sectional area of the test specimen, so that a record thereof can be made by the recorder 67.

In the actual tensile tester system, the sequential connection of the strain gage circuit to provide the various desired readings is performed automatically by various relays and switches responsive to the occurrence of predetermined test and operatonal conditions. In order to simplify the explanation of the strain gage circuit as shown in FIG. 15, all such automatic and alternative circuits have been eliminated from this figure, and reference numerals in this figure are the same as those on corresponding circuits and elements in the circuit diagram of FIGS. 3*a* and 3*b*. The strain gage 85 is provided with a shunting resistor $R_3$ which is connected across its terminals 86 and 89 with a variable potentiometer connection through a resistor $R_4$ to the strain gage terminal 87. This provides a voltage divider circuit between the terminals 86, 87, and 89 by which the electrical zero of the strain gage may be adjusted to calibrate the gage to provide a proper response thereof to stress placed thereon.

In order to expedite tests with this embodiment of the tensile tester, two denier potentiometers $R_{1a}$ and $R_{1b}$, FIG. 3*a*, are provided which are adapted to be alternately connected in circuit with the strain gage. The connection of one or the other of these two denier potentiometers in the circuit is controlled by a suitable two-circuit position relay $R_{yR}$, which may conveniently take the form of a ratchet relay. This relay is operable to one or the other of its two positions in response to the initial start circuit energization which begins the operation of the tensile tester at the start of each sequential operation thereof. In order to simplify the explanation of the strain gage circuit and its operation, FIG. 15 shows only the denier potentiometer $R_{1a}$ as connected directly across relay contactors $S_{6C}$ and $S_{5C}$, with the potentiometer contactor connected directly to relay contactor $S_{5B}$. This potentiometer is adapted to correct the voltage impressed across the strain gage terminals 86 and 89 in accordance with the cross-sectional area of the test specimen fiber. Voltage across this denier potentiometer $R_{1a}$ is adapted to be varied manually by the test operator and to be set in accordance with the denier of the test specimen.

In practice, it has been found convenient to calibrate the potentiometer dial directly in terms of denier, so that an operator can set the dial and therefore the potentiometer to the denier reading obtained from the vibrascope determination of the denier of the specimen involved. In fact, if desired, the vibrascope control dial and shaft may comprose the very dial and shaft of the denier potentiometer. In this manner, the operator can check the denier of a test specimen on a vibrascope and can dial this denier reading directly on one of the denier potentiometers, such as $R_{1a}$, FIG. 3*a*, place this test specimen on the tensile test apparatus, set the automatic sequence tester into operation by simply pressing a start button 90, and then proceed to determine the denier of another test specimen. After having determined the denier of the other test specimen, the operator can dial this denier on the other denier potentiometer $R_{1b}$, and, in most instances, the automatic tester will have completed the first test sequence and will have restored all of the operating components of the test apparatus to their zero or start positions. Furthermore, as has been explained with reference to FIG. 8, the air nozzle 23 will have projected a jet of air against the upper tab 15, so as to purge the apparatus of all broken parts of the test specimen on which the last test was performed, thereby placing the test apparatus in condition for the start of a new test. The operator then can simple remove the test specimen from the vibrascope, place it on the test apparatus, and restart the test cycle by again pressing on the start button 90. This will jog the ratchet switch $R_{yR}$ to its other position whereby the other denier potentiometer $R_{1b}$ is placed in the strain gage circuit and the test proceeds with the strain gage indications corrected according to the denier of the new test specimen. In this manner, very little time is lost in performing a large series of tests, and the stress-strain curves for a number of test samples all can be plotted upon the same coordinate paper by the recorder 67. This makes possible the ready comparison of the test results corrected to a common cross-sectional area base and also provides for the ready determination of an average thereof.

As shown in FIGS. 3*a* and 15, the switches $S_5$ and $S_6$ are simultaneously operable to either of two positions by reason of both operating coils of these switches being connected in parallel to make them responsive to the same operating condition. In the simplified schematic diagram of FIG. 15, these two switches are shown as being mechanically connected together and simultaneously operable to one of two positions. If these switches are operated in the direction indicated by the arrow 91, they are placed in positions for energizing a stress recording circuit through the strain gage 85. This circuit eliminates certain of the circuits shown in this figure and results in the simple circuit shown in FIG. 16. This latter figure also omits the strain gage adjustment potentiometers and resistances $R_3$ and $R_4$ and the range change resistors and circuits $R_8$ and $R_9$. All references to potentiometer $R_{1a}$ in FIGS. 15, 16, and 17 are equally applicable to potentiometer $R_{1b}$, as these are alternately connected in the circuit by the two-position relay $R_{yR}$, FIG. 3*a*, both serving the same purpose in the circuit. As shown in this figure, when the contactor of potentiometer $R_{1a}$ is in the position *a*, full battery voltage from the battery 79 will be impressed across the strain gage terminals 86–89. By a proper design and adjustment of the strain gage, this voltage across the terminals 86–89 can be made to give an indication which will correspond to 2.5 grams per denier stress on the strain gage. By a proper choice of the range of sensitivity, this strain gage indication can be made to provide a full scale deflection of the recorder roll 69. By a proper choice of the resistance characteristic of the potentiometer $R_{1a}$, a change in the setting of the potentiometer contactor to the position *b* can be made to produce a division of votlage between the potentiometer and the strain gage such that twice the force, or 5 grams, will be required to stress a test specimen having twice the cross-sectional area, or a size of two deniers, for this position of the potentiometer. Similarly, test specimens having still larger cross-sectional areas can be tested by providing a proper correction through the potentiometer $R_{1a}$ corresponding to the denier of the test specimen, as by placing the potentiometer contactor in the position *c*, such that a full scale deflection of the recorder roll 69 will still be made on the basis of 2.5 grams per denier. Thus, it is seen that by a simple dialing of the contactor of the potentiometer $R_{1a}$ to a position corresponding to the denier of the test specimen, the stress recorded by the recorder 67 will always be in terms of force per unit cross-sectional area of the test specimen. This provides a common ground for immediate comparison of all of the test results, regardless of variations in the sizes of the test specimens.

On completion of the test sequence of operation of a tester to the point where a test specimen is broken, this embodiment of the present invention is adapted automatically to energize the operating coils of the switches $S_5$ and $S_6$, so as to close the circuits A, B, and C of the switch $S_6$ and the upper circuits A and B of the switch $S_5$, FIG. 3*a*, which corresponds to the position of the contactors $S_{5A}$, $S_{5B}$, $S_{5C}$, $S_{6A}$, $S_{6C}$, as indicated by the arrow 92 in FIG. 15. This position of these contactors opens and closes circuits of the strain gage to provide the simple circuits shown in FIG. 17. As shown in this figure the strain gage terminals 86 and 89 are disconnected from the battery 79 and the Y-axis control leads 83 are connected across the strain gage terminals 87 and 88 as in the previous circuit connection, so that it is not necessary to break the circuit for these electrical connections and to connect these terminals of the strain gage across a voltage divider comprising a 1-denier recording resistor $R_6$ and a denier record calibration potentiometer $R_7$. This latter potentiometer is adapted to be connected in series with the contactor of the denier correction potentiometer $R_{1a}$, so that the voltage across the strain gage terminals 87—88 will be proportional to the denier setting of the denier correction potentiometer $R_{1a}$.

For most operating conditions, when the denier correction potentiometer $R_{1a}$ is set to read one denier, which corresponds to the position *a*, FIGS. 15 and 17, the voltage will be divided by the 1-denier recording resistor $R_6$ and the denier correction potentiometer $R_{1a}$, so that the recorder roll 69 will be positioned angularly relative to the recorder pen 68 along the recorder Y-axis to scribe a line on the coordinate paper corresponding to one denier. If the setting of the voltage divider does not provide this recording by the pen 68, the angular position of the roll 69 can be adjusted by varying the resistance of the denier record calibration potentiometer $R_7$ connected between the strain gage terminal 88 and the contactor of the denier potentiometer $R_{1a}$. For most standard tests, the potentiometer $R_7$ need only be checked at the beginning of a series of tests to obtain the correct setting for calibrating the position of the roll 69 in relation to the denier scale, and this setting of the potentiometer $R_7$ may then remain fixed for the remainder of the tests. In this manner, whenever the circuit of the strain gage is shifted to the denier recording position, indicated by the arrow 92 in FIG. 15, the recorder pen 68 will automatically scribe an indication of the denier setting of the denier potentiometer $R_{1a}$, and thus record the size of the test specimen on which a test has been completed.

In order to obtain an accurate interpretation of stress-strain relationships, it is desirable that the strain of a test specimen be expressed in units which are comparable for various tests. This is particularly important where the stress-strain tests are to be utilized for checking production quality where a large number of tests must be continuously performed in order to provide a practical means for controlling variations or trends away from a desired average during normal production. Strain in such tests can be expressed directly as elongations of the test specimens where the length of the specimens can be maintained with a reasonable assurance of uniformity. The length of specimens having relatively large cross-sectional areas usually can be carefully defined and controlled for most tensile testing. In the case of single fibers, however, especially where the fibers have varying degrees of crimp, it is extremely difficult to devise a mounting or holding arrangement for the fibers which will permit proper tensioning of the fibers so that each one will have the same length after it has been mounted on the tensile tester and the extension yoke has been operated so as to remove all of the slack in a fiber. Accordingly, in order to avoid careful prestressing of fibers, each fiber is mounted on the holding tabs in a relatively slack condition.

With such a slack mounting, a recordation of the movement of the extension yoke as an indication of the elongation of a test specimen will not give an accurate indication of strain of the specimen under stress during the initial movement of the extension yoke. FIG. 18 illustrates the stress-strain curves which are obtainable by tests made on fibers having varying degress of crimp, and in which the strain of the fibers is recorded in terms of the extension of the extension yoke. As shown in this figure, curves *a*, *b*, and *c* have characteristics which are very similar to each other except for the recordation of the actual strain, as represented by the initial toes *a'*, *b'*, and *c'* of these curves. The curve *a*, representing a fiber having relatively low crimp, is shown to have a relatively small extension or strain in the toe portion *a'*, whereas the extension for the highest crimp fiber represented by the curve *c* is rather large in the toe portion *c'*, and the intermediate crimp curve has an intermediate amount of extension in the initial toe portion *b'* thereof. Thus, the individual curves from test samples are spread out along the strain axis depending upon the degree of crimp. As a result the variation in the ultimate elongation of test fibers caused by differences in crimp is great enough to make the interpretation of the test results very difficult for quality control.

An inspection of these curves indicates that if the recordation of the elongation were to be initiated after the test specimens were loaded to about 2% stress, the toes in these curves would be eliminated and the starting point of the curves would substantially coincide, so that the resultant curves a′, b′ and c′ would be very closely superimposed, one upon the other, as shown in FIG. 19. Such a set of curves enables one to make an easy and rapid visual estimation of the average characteristics of the sample fibers. Furthermore, as shown in this figure, the portion of the curves extending below the 2% stress point *d* can be extrapolated as a substantially straight line *d—e* to the point where this line intersects the strain axis. The strain indicated by the value *e*—O therefore is a substantially constant correction $\Delta E$ which must be added to the strain recordings in order to give a true measure of the actual strain of the test specimens after the effects of crimp have been removed from the stress-strain curves recorded. It is desirable, therefore, that provision be made so that the strain indications will eliminate all the effects of crimp in the stress-strain curves.

The delicate nature of individual fiber filaments also makes it very difficult to cement the ends of the fibers to the mounting tabs consistently at the same length between points secured to these tabs. It has been found in practice that it is not practical to attempt to maintain this length accurately. An effort is made, therefore, merely to mount the single fibers with a generally constant length, and variations from the desired average length resulting from such mounting of the fibers merely results in a spreading of the stress-strain curves in the same manner as varying degrees of crimp in the various fibers. Thus, the curves *a*, *b*, and *c* of FIG. 18 also may be considered as representing test specimens having slightly different initial unstressed lengths.

The effect of crimp in unstressed fibers is the same as the introduction of an additional length of fiber over the average length thereof, and therefore a correction in the test circuitry for eliminating the effects of crimp can also be utilized to correct for variations in the initial mounted lengths of fiber test specimens. In view of the fact that the toe portion of most of the stress-strain curves can be eliminated from such records of the stress-strain tests by initiating the record after the test specimens have been stressed to a small degree, substantially 2% for most single fibers, the stress circuitry can be utilized to prevent recordation of stress-strain test results until the stress on any given specimen exceeds 2%. A very simple manner for obtaining this result is to mount a microswitch in the circuit which is responsive to a predetermined stress on the test specimen, such as 2%, which will close a circuit at this predetermined stress to initiate recordation of the test results. Since the stress is plotted on the stress-strain curves along the Y-axis of such curves, a microswitch can conveniently be placed on the recorder in a position so that it will be actuated by the operation of the recorder to a 2% stress position. In the conventional X—Y recorder 67 provided with a roll 69 on which the coordinate paper is mounted and in which the angular position of the roll 69 indicates the Y coordinate or stress, it has been found very convenient simply to mount a microswitch 94 adjacent to an end of the roll 69 and operable by it. This is readily done by placing the microswitch operating finger 95 in a position engageable by an element of the roll 69 such that when the roll 69 has moved from its zero position through an angle corresponding to 2% stress, the microswitch 94 will close an electrical circuit which will initiate the operation of the scribing pen 68, so as to initiate recordation of the stress-strain relations indicated by the tensile tester.

The most convenient measurement of length and elongation of test specimens is obtainable by obtaining indications of the physical position of the elongation yoke in relation to the upper tab holder 18. Furthermore, since the rotational position of the elongation cam 42 is directly related to the position of the extension yoke, the rotational position of the cam 42 can conveniently be utilized to provide an indication of the position of the elongation yoke. This indication can be effected very easily electrically by connecting a continuously rotatable potentiometer to the elongation cam 42 in such a manner that the rotational position of the potentiometer will bear a definite relation to the position of the cam 42.

Electrical circuitry for carrying out these test measurements and indications are incorporated in the system schematically represented in FIGS. 3*a* and 3*b*. A continuously rotatable potentiometer $R_{10}$ is connected in the system as an elongation potentiometer which can be driven in a direct relationship to the drive of the elongation cam 42, whereby a voltage obtainable from this elongation potentiometer $R_{10}$ can be made to be directly responsive to operation of the cam 42 and to provide an electrical signal indication which varies in accordance with the position of the cam 42. Such a potentiometer will give an indication of strain directly proportional to the position of the extension yoke relative to the upper tab holder 18 and will, therefore, give an indication of strain corresponding to the strain recordations of curves such as those in FIG. 18. It becomes desirable, therefore, to provide for modifying the electrical signal indication provided by the elongation potentiometer $R_{10}$ to correct for variations in the initial unstressed length and crimp of test specimens in order to obtain stress-strain curves of the type shown in FIG. 19, wherein the effects of unequal initial prestressed fiber samples are eliminated.

Furthermore, in view of the variations in the initial length and crimp of test specimens, any given actual elongation of a test specimen is not a true indication of the strain in the specimen, as it is not an indication of the elongation per unit length, but is merely an indication of the total elongation of the sample. It becomes necessary, therefore, to obtain a measurement of the strain of test specimens in terms of percentage elongation, so that the effects of different initial prestressed lengths and crimp in the single fibers will be eliminated from the test results as finally indicated and recorded so that the strain, as recorded in the curves, will be a true representation of the strain per unit length of the test specimens.

Circuitry for the provision of indications directly responsive to percentage elongation, that is, to the strain per unit length, is shown in the embodiment of this invention illustrated in FIGS. 3*a* and 3*b*. In order to simplify the explanation of this circuitry, a simplified circuit diagram of the elongation circuit is shown in FIG. 14. As there represented, the elongation potentiometer $R_{10}$ is connected in series with a length correction potentiometer $R_2$ across a suitable source of direct current, such as a battery 66. These two potentiometers $R_2$ and $R_{10}$ constitute a voltage divider, wherein the voltage $V_{R10}$ across the elongation potentiometer through its movable contactor gives an indication in accordance with percentage elongation of the test specimen. If the correction potentiometer movable wiper contactor is in its zero length correction position, indicated by the position *a*, FIG. 14, the voltage $V_{66}$ across the elongation potentiometer $R_{10}$ is equal to the total voltage of the battery 66. The position of the movable wiper contactor for the elongation potentiometer $R_{10}$ then is adapted to give an electrical signal voltage $V_{R10}$ indicating the actual displacement or length of the elongation yoke.

With the contactor in the position *a′*, that is, its zero elongation position, substantially zero voltages $V_{R10}$ will appear across the elongation potentiometer $R_{10}$ from its terminal 96 to the wiper contactor. If this voltage is connected across the control circuit for the X-axis of the recorder 67, it will indicate zero elongation at this point. Similarly, when the movable wiper contactor is shifted to the position *b′*, the voltage $V_{R10}$ across the elongation potentiometer from its terminal 96 to *b′* will be proportional to the displacement from $b'$ to the terminal 96, and will give an electrical signal indicating the displacement of the elongation yoke corresponding to the actual elongation of a test specimen.

Carrying this analysis to the final position $c'$ shows that the full voltage of a battery 66 across the potentiometer $R_{10}$ will indicate 100% displacement of the elongation yoke and, therefore, an elongation of the test specimen corresponding to the maximum displacement of the elongation yoke. This 100% or maximum displacement position $c'$ of the elongation potentiometer preferably is chosen to correspond to an elongation of a specimen equal to the predetermined gage length of a pre-stressed test specimen, so that 100% potentiometer movement corresponds to 100% elongation of a test specimen of gage length.

This can conveniently be obtained by mechanically coupling the elongation potentiometer $R_{10}$, FIG. 4, to the elongation cam drive shaft 46 through a drive gear 97 and a driven gear 98 to give a zero potentiometer position $a'$, FIG. 14, corresponding to the zero elongation position $a$, FIGS. 4 and 12, of the cam 42, and a 100% elongation potentiometer position $c'$, FIG. 14, corresponding to the 100% elongation position $c$, FIGS. 4 and 12, of the cam 42. As previously explained, the potentiometer $R_{10}$ is of the continuously rotatable type, so that continued rotation of the potentiometer past its 100% position, merely restores it to its zero position and restarts the cycle. Suitable circuits prevent any signals from the elongation potentiometer after the completion of a test cycle, and other circuits and drives provide for always restoring all of the test equipment, including the potentiometer $R_{10}$, to its zero position and for holding it in this position after the completion of a test and a completion of the recordation of all of the desired test information. Under certain conditions, it is desirable to provide for an expanded scale in the recordation or indication of certain aspects of a test, such as the percent elongation of a sample below its yield strength. In addition, certain types of specimens may normally have a relatively greater percentage elongation than other specimens made of other types of materials, and it may be desirable, therefore, to vary the indications and recordations of percentage elongation so that the record thereof can be kept within the range of the indicating or recording equipment.

The embodiment of the present invention illustrated in FIGS. 3*a* and 3*b* includes a range changing circuit for use with the elongation circuit so that various predetermined percentages of elongation will provide a full scale indication or recordation on the recorder 67. FIG. 14 shows a simplified circuit diagram of this portion of the overall circuit in connection with the length correction and elongation potentiometers. As indicated in this figure, the recorder elongation circuit impedance across its X-axis terminals, in this embodiment of the invention, is adjusted to 1000 ohms. A range change set of resistances $R_{13}$, $R_{14}$, and $R_{15}$ are connected in series with each other and to terminals $D_5$ and 99, 99 and 100, and 100 and 101, respectively, for connection in series between the elongation potentiometer $R_{10}$ movable contactor by a range change switch $S_2$. The desired range may be varied by the switch $S_2$ either manually or by automatic selection during a test. As shown in FIG. 14, in this embodiment, $R_{15}$ is 149,000 ohms, which together with the recorder X-axis impedance gives a total of 150,000 ohms. Closure of the switch $S_2$ to connect the resistor $R_{15}$ through its contacts 100 and 101, in series with the potentiometer $R_{10}$ movable contactor, is adapted to provide for a full scale indication or movement of the recorder pen 68 corresponding to 25% extension of the elongation yoke and, therefore, to 25% elongation of a test specimen. This is a high sensitivity response to the recorder 67 with regard to elongation of a specimen.

When it is desired to have a less sensitive indication of the elongation of a specimen by the recorder 67, the range change switch $S_2$ is adapted to close a circuit from the movable contactor of the potentiometer $R_{10}$ to the terminal 99 so as to place the range changing resistances $R_{14}$ and $R_{15}$ in series therewith and the X-axis recorder circuit. In this embodiment, the resistance $R_{14}$ conveniently is chosen as 150,000 ohms, so that this circuit has exactly twice the impedance of a circuit using only the resistance $R_{15}$. This position of the range change switch $S_2$ doubles the resistance across the elongation potentiometer in the recorder X-axis circuit and makes the recorder indications only half as sensitive as those obtainable when only the resistance $R_{15}$ is in series therewith. Since the resistance $R_{15}$ was of a value to give a full scale recorder indication for a 25% elongation, as indicated by the elongation potentiometer $R_{10}$, the insertion of both of the resistances $R_{14}$ and $R_{15}$ will give a recorder full scale indication for a 50% elongation indication by the elongation potentiometer $R_{10}$. For most tests, these two ranges of elongation will be found sufficient.

In some instances, where more elastic materials are to be tested and the total elongation of specimens prior to the breakage thereof may be expected to approach 100% elongation, that is, the specimens may be expected to reach almost twice their unstressed length before breaking, it is desirable that the recorder should provide a full scale indication for 100% elongation, as indicated by the elongation potentiometer $R_{10}$. This can be obtained by inserting all three resistances $R_{13}$, $R_{14}$, and $R_{15}$ in series with the recorder X-axis circuit and across the elongation potentiometer. As shown in FIG. 14, this circuit is obtained by connecting the terminal $D_5$ to the movable wiper contactor of the elongation potentiometer $R_{10}$. In this embodiment, the resistance $R_{13}$ has a resistance of 300,000 ohms, which, together with the resistance $R_{14}$, $R_{15}$ and the impedance of the recorder X-axis, gives a total impedance of 600,000 ohms or four times the impedance of the 25% elongation terminal resistance through the terminal 100, and a 100% elongation will give full scale operation of the recorder pen 68. In this manner, the indication of elongation by the recorder 67 can be varied very readily to give a plurality of full scale range of elongation.

All of these considerations have been made with the length correction potentiometer $R_2$ in its position $a$ corresponding to zero length correction. For all positions of the potentiometers $R_2$ and $R_{10}$, the combined voltage drop thereacross is equal to the source voltage $V_{66}$ of the battery 66. This may be expressed as $V_{66}=V_{R2}+V_{R10}$. By construction and by choice of the range change resistance, the voltage $V_R$ impressed across the recorder X-axis circuit and the range change resistance in series therewith corresponds to the position of the movable contactor of the elongation potentiometer $R_{10}$ as a percentage of the total resistance of this potentiometer. This may be expressed as $V_R=\text{percent } V_{R10}$.

Since $$V_{66}=V_{R2}+V_{R10}$$
$$V_{R10}=V_{66}-V_{R2}$$

Therefore:

$$V_R=\text{percent }(V_{66}-V_{R2})$$

It is clear, therefore, that the voltage across the recorder X-axis circuit plus the connected range resistance varies as a percentage of the voltage across the elongation potentiometer, which varies inversely with the resistance of the length correction potentiometer $R_2$ and, therefore, with the voltage thereacross.

The simple adjustment of the contactor for the length correction potentiometer $R_2$ in accordance with the variation of the true length of a pre-stressed test specimen will, therefore, provide for an accurate measurement of the percentage elongation or the elongation per unit length of the specimen. This percentage elongation is indicated by the voltage $V_R$, as previously explained. In accordance with a consideration of the stress-strain curves of FIGS. 18 and 19, it is desirable in most instances to prevent the indication or recordation of strain or elongation of the specimen before it has been stressed sufficiently to remove the effects of crimp or other slack effects inherent in the fiber. It is desirable, therefore, to prevent the sending of an electrical indicating signal of percent elongation to the X-axis controlling the pen 68 of the recorder until the recorder roll 69 has been angularly positioned to its predetermined pre-stress point. As previously explained, this pre-stressing has been found to eliminate the toes in the curve shown in FIG. 18 for most fibers at about 2% stress. It is convenient, therefore, to connect the microswitch 94 so that it initiates a step in the automatic control of the system to provide for connection of the elongation circuit to the strain recording or X-axis control of the recorder on the occurrence of 2% stress in the test specimen, as indicated by the 2% control position of the roll 69. Details of this circuit are illustrated in FIGS. 3*a* and 3*b* and will be explained in connection with the operation of the complete system.

For most tests, it will be found desirable to operate the tensile tester as an automatic apparatus. It generally is desirable to obtain a recordation of the elastic modulus and yield strength portions of the curves at relatively high sensitivity, so that the coordinates for this portion of the recording will be relatively larger than the coordinates for that portion of the stress-strain curve between the yield strength and the breaking strength of the test fiber specimen. In order to obtain this type of automatic operation of the tensile tester, the manually operable switch $S_1$ is placed in the number 2 position, as indicated in FIG. 3*b*.

Automatic sequencing of the tester illustrated in the drawings is controlled by a six bank multiple position stepping switch $S_S$. This switch may comprise any suitable conventional circuit breaker for performing the desired functions, such as a type 44 rotary stepping switch manufactured by the Automatic Electric Company, and described in Circular 1698–F of this Company. For most of the automatic operation, advancement of the stepping switch from position to position is controlled by suitable microswitches located in the recorder or in the elongation drive unit shown in FIGS. 1 and 2. All of the operating components such as electric clutches, brakes, relays, motors, and electrical control air valve are electrically connected to appropriate contact positions on the stepping swtich $S_S$ for energization when the associated switch wiper contactor of a particular switch bank provide a circuit therethrough. All of the microswitches within the equipment unit shown in FIGS. 1 and 2 are cam actuated and are related to the angular position of either the elongation cam 42 or the wiper contactors of the potentiometers $R_2$ and $R_{10}$. The microswitches in the recorder both are related to the stress axis, which, in the illustrated embodiment, is defined by the operation of the roll 69. One of these recorder microswitches is actuated at 2% stress or 2% of full scale angular displacement of the roll 69, and the other is actuated by the reverse rotation of the roll 69 when a test fiber specimen breaks and the roll tends to return to its zero stress position.

Automatic operation of a tensile test for a single fiber which has been secured to a pair of tab holding elements, as shown in FIG. 9, is begun by simply determining the denier of the fiber on any conventional vibrascope and dialing this denier size measurement of the fiber directly on the denier potentiometer $R_{1a}$. This dial can conveniently operate the potentiometer wiper contactor and be calibrated so that one denier equals 100, two deniers 200, etc. for the range of the denier potentiometer. The 100 and 200 positions are indicated at *a* and *b*, respectively, in FIG. 15. It should be noted that the resistor $R_6$ is adapted to be connected in series with the denier potentiometer $R_{1a}$ for denier recording purposes, as when the switch $S_{6A}$ is closed during the denier recording step in the automatic operation of the tensile tester. This resistor $R_6$ is of a value corresponding to one denier on the denier potentiometer, and was chosen to have this value as the minimum size of fiber to be tested on the illustrated tensile tester. As shown at FIG. 17, when the wiper contactor of the denier potentiometer $R_{1a}$ is in its 1-denier position, indicated at *a* in this figure, the voltage across the Y-axis of the recorder would be zero if the resistor $R_6$ were not inserted. This resistor $R_6$ therefore provides the basic voltage indication for the 1-denier position of the recorder.

Should the recording of denier require adjustment in its calibration, an additional potentiometer $R_7$ is adapted to be connected in series between the strain gage terminal 88 and the wiper contactor of the denier potentiometer $R_{1a}$ or $R_{1b}$. Under normal operating conditions the denier record calibration potentiometer $R_7$ is set when the initial calibration of the tensile tester is made and usually will not require further adjustment unless the recorder unit is used with a different elongation drive unit.

After the denier potentiometer has been dialed to the proper setting for the denier of the fiber undergoing tests, the operator simply places the fiber in testing position on the elongation unit of the system and presses the start button 90. This may conveniently be done by simply hooking the opening 16 in the upper holding tab 15 over the tab holding hook or finger 18, FIG. 3*a*, or dropping the fiber into the slot between the wing guides 17 of the tab chute so that the lower edge of the upper tab 15 will fall upon the retaining walls 19 of the tab holder 18, FIG. 8, and be accurately positioned thereon. The operator then merely presses the start button 90, FIG. 3*a*, and the automatic operation of the tensile tester is set into motion and sequentially performs all of the desired tests, determining the stress-strain relationships of these test specimens as the test proceeds, determining the yield strength and tensile strength of the specimen, indicating and recording these values, and finally indicating and recording the cross-sectional area of the test specimen in terms of the denier thereof, as dialed on the potentiometer $R_{1a}$ or $R_{1b}$.

Closing of the start button 90 energizes the solenoid coil 102 of the stepping switch $S_S$ thereby stepping all of the wipers of the banks 1, 2, 3, 4, 5, and 6 of the switch to position number 1 thereof, and opening the solenoid contacts 103. After the stepping switch solenoid coil has been energized and stepped to its first position, the starting switch button 90 is released, and no further attention by the operator is necessary in order to obtain a complete automatic sequential operation of the tester. A condenser 104 preferably is connected across the contacts 103 of the stepping switch in order to minimize possible arcing of the contacts.

With the test fiber specimen hanging freely from its upper holding element and the stepping switch in position 1, the claws 29 on the elongation yoke are adapted to be driven downwardly until they engage the upper surface of the lower fiber holding tab 15' for stressing the fiber during the test. Position 1 of the wipers of the stepping switch $S_S$ closes a circuit through bank 3 which connects a 90 volt source of direct current through this bank to the operating coil 105 of the range changing switch $S_2$. This energization closes the circuit through the contacts 100 of the range changing switch and places the high sensitivity 25% range resistor $R_{15}$ in series with the wiper contactor of the elongation potentiometer $R_{10}$, so that indications of elongation provided by the signals responsive to the position of the elongation potentiometer will give a full scale deflection of the pen 68 for 25% elongation of a test specimen. The wiper of bank 5 will energize the coil of relay $R_{y2}$, thereby closing a circuit through contacts B thereof, which energizes the high speed motor 47 across the 115 volt source of power, FIG. 3*b*. Energization of the relay $R_{y2}$ through the wiper of bank 5 also provides for the closing of a circuit through the relay contacts A, which closes a circuit and energizes the exciting winding of the high speed motor clutch 52, as shown in FIG. 3*b*, and thereby provides for the mechanical drive of the shaft 46 through the clutch 52 by the motor 47. The wiper of bank 6 of the stepping switch energizes the low speed motor 57 and also starts its operation. Since both the high and low speed motors are thus put into operation, the clutch drive countershaft 54 will be driven at a relatively high speed by the high speed motor 47 and the operation of the low speed motor 57 will have no effect on the clutch countershaft 54 due to the operation of the overriding clutch 65 as previously described. Bank 4 in position 1 energizes the operating coil of the ratchet relay $R_{yR}$, thereby placing in circuit one of the denier potentiometers $R_{1a}$ or $R_{1b}$, which has been previously dialed to indicate the denier of the fiber test specimen undergoing tests. In this manner, the claws 29 of the elongation yoke move at a relatively high speed downwardly over the lower tab 15' until the under surface 29' thereof is almost in engagement with the upper surface of the tab 15'. This position of the elongation yoke corresponds to the zero elongation position of the claws 29 and the cam 42 and places the zero elongation microswitch operating cam 106 in its microswitch closing position, thereby closing a circuit through the microswitch 107, the contact 1 of bank 1 of the stepping switch to the 50 volt direct current source of power and to terminal 1 of the bank of terminals 108 of the stepping switch $S_S$. Since the operation of the stepping switch to its first position opens the circuit through the stepping switch contacts 103, and the start button was released after starting of the test operation, the solenoid 102 of the stepping switch was deenergized, thereby closing the circuit through the stepping switch contacts 103. Thus, the circuit through the zero elongation switch 107 and the stepping switch terminal 108 again energizes the stepping switch operating coil 102 and steps it to its position 2.

In this position of the stepping switch $S_S$, the high sensitivity range change coil 105 of the switch $S_2$ remains energized, so that the sensitivity of the recorder response remains in the high sensitivity position in which it was placed by the wiper of bank 3 in its number 1 position. Bank 2 in position 2 energizes a length correction potentiometer electromagnetic clutch 109, which couples a clutch countershaft 110 driven through gear 97 and gear 110 to a potentiometer drive shaft 112 which is mechanically coupled for driving the length correction potentiometer wiper contactor 113. This is adapted to place the length correction potentiometer contactor 113 in an angular position for varying the resistance of this potentiometer in direct relationship to the angular position and rotation of the cam drive shaft 46 and therefore of the cam 42 and the elongation yoke claws 29. In this manner, all further movement of the elongation claws 29 produces a corresponding insertion of resistance by the length correction potentiometer into the elongation circuit during this position of the stepping switch.

Bank 5, in position 2, energizes the operating coil of relay $R_{y3}$ to open its contacts 114. The wiper of bank 6 continues to energize the low speed motor 57, so that it continues to operate, and, since the high speed motor 47 now is deenergized due to the deenergization of the operating coil of the relay $R_{y2}$, the low speed motor 57 drives the cam shaft 46 through the overriding clutch 65. The high speed motor 47 also is fully disconnected mechanically from the cam drive shaft 46, as the high speed clutch 52 also is deenergized when the operating coil of the relay $R_{y2}$ is deenergized. This provides for a smooth transition of the operation of the elongation cam 42 and the elongation yoke claws 29 from the initial high speed drive by the motor 47 to a low speed drive through the overriding clutch 65 from the low speed motor 57.

Under the slow speed advance of the elongation yoke claws 29 by the low speed motor drive, the fiber 13 is slowly placed under stress so as to remove all of its slack, and this stress is transmitted through the tension bar 84 to the strain gage 85. This produces an electrical signal from the strain gage proportional to the stress in the fiber 13 which is transmitted through the stress recording circuit described in connection with FIGS. 15 and 16 to the Y-axis control 71 of the recorder. This signal is suitably amplified and transmitted to the roll operating servomotor 70 which moves the roll 69 angularly to a position corresponding to the stress in the fiber 13.

When the stress in the fiber 13 reaches a predetermined value of 2%, the actuating finger 95 of the microswitch 94 will close the circuit through this switch and energize the stepping switch solenoid coil 102 through terminal 2 of the stepping switch bank of terminal 108 from bank 1. This causes the stepping switch to be actuated to its position 3, thereby again opening its contacts 103 and deenergizing its operating coil 102.

In position 3, the stepping switch continues to energize the high sensitivity switch coil 105 through bank 3, and thereby continues the high sensitivity electrical circuit for the recorder. Bank 4 energizes an electromagnetic clutch 115 which couples the elongation potentiometer drive gear 98 through its shaft 116 to a drive shaft 117, which mechanically drives the wiper contactor 118 of the elongation potentiometer $R_{10}$. This angularly positions the wiper 118 so that it places a resistance in the elongation potentiometer circuit which is directly proportional to the extension of the elongation yoke claws 29 beyond the 2% stress position, and thereby provides a direct electrical signal indication responsive to the elongation of the fiber 13 beyond the 2% stress position. This electrical indication is transmitted to the X-axis control 75 of the recorder 67 and positions the recording pen 68 in accordance with the elongation of the fiber 13. This elongation circuitry has been previously explained in detail with reference to the simplified diagram in FIG. 14.

The wiper of bank 2 of the stepping switch opens the circuit of the length correction clutch 109, thereby maintaining the length correction potentiometer $R_2$ in its position corresponding to 2% stress in the fiber test specimen 13. Bank 6 of the stepping switch continues to energize the low speed motor 57, so that the elongation cam 42 continues to extend the elongation yoke claws 29 at low speed. During this portion of the operation of the test cycle, the cam 42 engages the follower 43 with its cycloidal cam surface between the points *b* and *c*, FIGS. 2 and 4, which extend the elongation yoke at a constant speed, thus continuing the smooth application of stress to the test specimen 13. The wiper of bank 5 of the stepping switch continues the energization of the solenoid coil of the relay $R_{y3}$, and maintains open its contacts 114.

For most fiber test specimens, the yield strength will be reached before a 10% elongation of the fiber has occurred. This fact, therefore, is utilized to control a transfer of the recordation sensitivity from a high sensitivity to a low sensitivity condition. This 10% elongation can conveniently be indicated by a cam 119 mounted on the elongation potentiometer shaft 117 and bearing a direct angular relationship to the position of the elongation potentiometer wiper 118. The cam 119 is formed with a cam surface 119' adapted to actuate a microswitch 120, so that when the specimen fiber 13 has been elongated 10%, as reflected by the position of the elongation potentiometer, the microswitch 120 will close a circuit through its contacts and through the wiper of bank 1 in position 3 of the stepping switch, and terminal 3 of the stepping switch terminal bank 108, so as to energize the stepping switch operating coil 102.

Energization of this coil 102 operates the stepping switch to its position number 4. In this position, stepping switch bank 3 deenergizes the range change switch coil 105, thereby closing its low sensitivity contacts 99 and placing the recorder X-axis circuit in its low sensitivity condition, as previously explained in detail with reference to FIG. 14. This also closes the low sensitivity contacts 121 of the range change switch $S_2$ and shunts the strain gage Y-axis terminals by the resistor $R_9$, thereby also reducing the sensitivity of response of the recorder roll 69 to stress indications transmitted from the strain gage 85.

Bank number 4 of the stepping switch continues the energization of the elongation potentiometer clutch 115, so that it continues to operate in accordance with the position of the elongation cam 42 and the elongation yoke claws 29. Bank 6 of the stepping switch $S_S$ continues to energize the low speed motor 57, so as to continue the elongation drive at relatively low speed. During the shift from high sensitivity to low sensitivity response of the recorder to the elongation and to stress of the fiber 13, it is desirable to lift the recorder pen 68 from the roll 69, and this is conveniently done by energizing the pen lift actuator 77 through its pen lift control 122, which is energized through the contacts 123 of a pen lift relay $R_{y1}$. These pen lift relay contacts 123 are closed in response to energization of the relay coil 124 by the wiper of stepping switch bank 5 in position 4. The stepping switch is adapted to remain only a short time in position 4 as bank 5 opens the circuit of the coil of relay $R_{y3}$ in this position. Opening the circuit of the coil of relay $R_{y3}$ does not instantly cause the coil to become deenergized due to the connection of a condenser 125 across this coil. This time delay is just sufficient to provide for the automatic shifts which occur in this position of the stepping switch. The delayed closing of relay contacts 114 again energizes the stepping switch coil 102 through stepping switch bank 1 and terminal 4 of the stepping switch terminal bank 108.

This energization of the stepping switch coil 102 causes the stepping switch to actuate its wipers to position 5. In this position stepping switch, bank 4 continues to energize the elongation clutch 115, and therefore continues to provide for driving the elongation potentiometer wiper 118 in accordance with the extension of the elongation yoke claws 29. The drive of the elongation yoke is continued by the low speed motor, which is energized through bank 6 of the stepping switch in this position.

The test fiber specimen is stressed in this position of the stepping switch until it reaches its tensile strength and breaks. When the fiber breaks, the stress therein immediately falls to zero, and this is transmitted to the recorder roll 69 from the strain gage 85 through the roll driving servo motor 70 and its Y-axis control 71 which tends to return the roll 69 to its zero angular position.

At this point in the test, it is desirable to utilize the recorder to provide an indication of the cross-sectional area or denier of the test specimen. This can readily be done by shifting the connections of the energizing circuit for the recorder Y-axis from a circuit as shown in FIG. 16 to the circuit shown in FIG. 17 by the proper actuation of the switches $S_5$ and $S_6$. The operation of the circuitry of FIGS. 16 and 17 to provide this denier recordation has been previously explained, and the energization of the switches $S_5$ and $S_6$ to provide the shift is conveniently obtained by utilizing the reverse rotation of the recorder roll 69 to obtain the shift in the circuits through actuation of the stepping switch $S_S$ to its next position. This stepping switch actuation is provided for by a quick reverse microswitch 126 mounted in the recorder with its actuating finger 127 in engagement with a friction surface 128 extending circumferentially around the roll 69, adjacent to an end thereof. With this arrangement reverse rotation of the recorder roll 69, when the test fiber specimen breaks, immediately actuates the microswitch 126 to close the circuit through stepping switch bank 1 in position 5, and terminal 5 of stepping switch terminal bank 108, which again energizes the stepping switch coil 102, and moves this switch to its position 6.

Movement of stepping switch $S_S$ to position 6 continues the energization of the low speed motor 57 through stepping switch bank 6, so that the cam shaft 46 continues to be driven at relatively low speed through the overriding clutch 65. In this position the elongation potentiometer clutch 115 continues to be energized through a circuit including a microswitch 129, so that the elongation potentiometer wiper contactor 118 continues to rotate, even though the test fiber specimen 13 has been broken.

In this position of the stepping swtich, the length correction potentiometer clutch 109 is energized through the wiper of bank 2 and thereby resumes the drive of the length correction potentiometer through its shaft 112. The wiper bank 5 of the stepping switch $S_S$, in position 6, closes a circuit which energizes the operating coil of relay $R_{y4}$ through a resistor 130. A condenser 131 is connected across the terminals of the coil of relay $R_{y4}$ and together with the resistor 130 forms a time delay circuit for the energization of the coil $R_{y4}$, so that this relay is not actuated immediately upon the movement of the stepping switch to its position 6. After a predetermined lapse of time the coil of relay $R_{y4}$ becomes energized and actuates its contacts to closed circuit positions, thereby closing both the circuits A and B through this relay. Circuit A energizes the stepping switch operating coil 102 from bank 1 position 6, through terminal 6 of stepping switch terminal bank 108, and actautes the stepping switch to its position 7.

Stepping switch bank 6, in position 7, deenergizes the low speed motor 57 and energizes the high speed motor 47 through the circuit which is closed by the contacts B of relay $R_{y4}$. This operation of the high speed motor 47 provides a high speed drive for the main cam drive shaft 46 through the fast motor clutch 52, which also is energized in this position of the stepping switch through bank 3 of this switch. Bank 5 of the stepping switch preserves the energization of the coil of relay $R_{y4}$, thus maintaining closed the circuits through its contacts A and B. Bank 2 of the stepping switch continues energization of the length correction potentiometer clutch 109 through a microswitch 132, which is operable by a cam 133 drivingly mounted on the length correction potentiometer shaft 112. In this manner, the length correction potentiometer $R_2$ is driven at a relatively high speed by the high speed motor 147, through the clutch 109, and drives the cam 133 in accordance with the rotation of the potentiometer wiper contactor 113, which also is drivingly mounted on the shaft 112. The cam 133 is provided with a cam surface 133' which is adapted to actuate the microswitch 132 when the continuously rotatable length correction potentiometer wiper 113 has completed 100% operation and has been restored to its zero or starting position. Actuation of the microswitch 132 in this position of the length correction potentiometer opens the circuit which energizes the length correction potentiometer clutch 109, thereby mechanically disconnecting the drive of the length correction potentiometer 102 from the main cam drive shaft 46. This same actuation of the microswitch 132 closes a circuit through a brake 134 which energizes the brake, so that it locks the length correction potentiometer in this zero or starting position, thus preventing further actuation of the potentiometer wiper contactor 113 during the remainder of this test.

Stepping switch bank 4, in position 7, continues energization of the elongation potentiometer clutch 115 through microswitch 129, and thereby continues to rotate the elongation potentiometer shaft 117 and the elements driven by this shaft. A microswitch cam 135 is mounted on shaft 117 and is provided with a cam surface 135' which is maintained in a position corresponding to the angular position of the elongation potentiometer wiper contactor 118. By this means, when the contactor 118 has completed 100% operation and has been restored to its zero or starting position, the cam surface 135' will actaute the microswitch 129 so as to open the circuit of the elongation potentiometer clutch 115, thereby deenergizing the clutch and mechanically disconnecting the drive of the elongation potentiometer through its shaft 117 from the main cam shaft 46. This same actuation of the microswitch 129 by the cam surface 135' also closes a circuit through the microswitch and stepping switch bank 4, which energizes a brake 136. Energization of the brake 136 immediately stops and holds the elongation potentiometer wiper contactor 118 in its zero or starting position for the remainder of this test, thus positioning it for the start of another automatic sequential tensile test.

When a test specimen breaks, the lower holding tab 15' and the portion of the fiber attached thereto, simply falls away from the tensile tester elongation yoke claws 29, but the upper fiber holding tab 15 is left on the tab holder 18. In order to place the tensile tester completely in condition for the start of a new test by automatic restoration of all of its operating parts to starting conditions, it is desirable that the tester be completely purged or cleaned of parts of test specimens. This can conveniently be obtained by blowing the upper holding tab 15 off the tab holder 18 by a blast of air suitably directed against this tab. An air jet nozzle 23 is therefore provided with a supply of air by actuation of a valve, such as an electromagnetic valve operable by a solenoid 137, which is adapted to be energized through bank 6 when the stepping switch $S_S$ advances to position 7. This blast of air simply blows the upper tab 15 off the hook 18 in an embodiment, such as that shown in FIG. 3*a*, or is directed against the back of the tab 15 through an aperture 24 if it is mounted upon a holder 18, such as that shown in FIG. 8.

Continued rotation of the main cam drive shaft 46 by the high speed motor 47 will drive a microswitch cam 138, drivingly mounted on this shaft, in a predetermined relation to the position of the elongation cam 42, so that its microswitch actuating cam surface 138' will be in a position to actuate a microswitch 139 when the elongation cam 42 has been rotated through 85% of its operating cycle from its zero or starting position *a* in contact with the follower 43. Actuation of the microswitch 139, when the stepping switch is in position 7, closes a circuit through the stepping switch bank 1 and terminal 7 of the stepping switch terminal bank 108, which energizes the stepping switch exciting coil 102, so as again to actuate the stepping switch and move it from position 7 to position 8.

In this position of the stepping switch, the slow motor 57 remains deenergized, and the high speed motor 47 is energized through stepping switch bank 6, so that it continues to operate. The fast motor clutch 52 also is energized in this position of the stepping switch through bank 3 of the switch, thus continuing the high speed drive of the main cam drive shaft 46. The length correction potentiometer brake 34 is maintained energized through the stepping switch bank 2 and the microswitch 132. Similarly, the elongation potentiometer brake 136 is maintained energized by the stepping switch bank 4 through the microswitch 129.

In this position of the tester, the recordation of the various test results have been completed, and it is desirable that the recorder pen 68 should be lifted from the roll 69. This can conveniently be done by again energizing the pen lift solenoid 77 through its pen lift control 122 and the pen lift relay $R_{yl}$. In order to energize these circuits, the pen lift relay exciting coil 124 is energized through stepping switch bank 5, so as to close its contacts 123. This condition of the test system is continued until the elongation cam 42 has completed 100% operation and has been restored to its zero or starting position.

In order to place the test driving equipment completely in condition for starting a new test on the completion of each test, a microswitch cam 140 is drivingly mounted on the main cam drive shaft 46 and is driven thereby so that its position always corresponds with the position of the elongation cam 42. This cam 140 is formed with a cam surface 140' which is adapted to actuate a microswitch 141 in response to the restoration of the elongation cam 42 to its zero or starting position after 100% of its operating cycle. Actuation of the microswitch 141 closes an electrical circuit through stepping switch bank 1, in position 8, and through terminal 8 of stepping switch terminal bank 108, so as to energize the stepping switch exciting coil 102 and move this stepping switch to position 9. In this position, the recorder pen lift circuit is energized through stepping switch bank 5 so as again to lift the pen 68 away from the recorder roll 69. Stepping switch bank 6 again energizes the electromagnetic valve coil 147 and blows another blast of air through the nozzle 23 to assure a complete purging of the test apparatus on the completion of the test. Stepping switch bank 1 at this point energizes the stepping switch exciting coil 102 so as to move the switch to its number 10 position. In doing so, all of the circuits energized in position 9 are continued and the circuit through the stepping switch exciting coil 102 is again opened through its contact 103. Actuation of the stepping switch through its number 10 position again closes the circuit of the stepping switch exciting coil 102 through the stepping switch bank 1 and the stepping switch contacts 103, which latter were closed when the coil 102 was deenergized. This moves the stepping switch to its final operating position which places complementary wiper contactors on the zero or starting position contacts of the stepping switch and completely restores all parts of the tensile tester to test starting condiions.

When the tensile tester unit, illustrated in FIGS. 1 and 2, has been initially assembled and during its use after long periods of operation or when erratic test results are indicated, it may be found desirable to realign the driving equipment in this unit. In order to facilitate this realignment, a dial knob 142 is rigidly mounted on an end of the main countershaft 54 which extends through the bearing block 35 and the front of the frame 21. Manual turning of this dial 142 can be utilized to position the elongation cam and the elongation yoke in their respective cooperative zero or starting positions. By measuring the complete rectilinear displacement of the elongation yoke from its zero or starting position to its point of maximum displacement, it is possible to determine the position in which this elongation yoke should be for various percentages of elongation corresponding to the positions of certain controlling microswitch cams, so that if these cams are not in their proper microswitch operating positions when the elongation yoke is in the predetermined positions for operation of the microswitches, the cam positions may be adjusted relative to their drive shaft to give the desired operation. This is very important as a proper analysis of the test results depends largely upon the proper operation of the system in accordance with the displacement of the elongation yoke.

The embodiment of the present invention described and illustrated in this application provides a very simple automatic testing operation which can be performed by an unskilled or semi-skilled operator, as it merely requires four major operations on the part of the operator. These four operations comprise (1) a determination of the denier of the fiber on a vibrascope, (2) dialing of this denier determination on a potentiometer dial, (3) placing the fiber on the tensile tester apparatus, and (4) pressing a start button to set the tester into automatic operating condition. In addition to these steps, the operator will be required to be able to insert and replace coordinate paper on the recorder roll and to check or calibrate the testing apparatus if the test results appear to be erratic. In most instances this latter operation, however, would best be performed by one skilled in the operation and maintenance of sensitive measuring instruments.

Operation of the tester with the selector switch in position 2 is designed to provide the following simple operations which have previously been described in detail:

(1) A resistance proportional to denier is manually dialed into a potentiometer which modifies the voltage to the strain gage in proportion to sample denier.

(2) The sample is dropped into the loading chute, which orients the upper tab in the tab holder attached to the strain gage. The lower tab hangs free immediately below the claws on the extension yoke.

(3) The operator then pushes the start button to begin the test, which advances the function control stepping switch one step. The extension yoke is driven downward by the yoke drive cam by means of the fast speed drive through a clutch. The slow speed drive is energized simultaneously. The overriding clutch permits the high speed drive to override the slow speed motor. The extension yoke advances to a predetermined point in respect to the extension yoke displacement (a point selected to insure that the grip claws have covered the tab without applying any force to the sample), where a microswitch actuating cam, geared to the extension drive, actuates a microswitch, advancing the stepping switch one step.

(4) The high speed motor drive is then shut off and declutched; the length-correction drive clutch is energized simultaneously, and the yoke extension continues downward, driven by the slow speed drive through the overriding clutch. The length correction potentiometer sweeps out a resistance proportional to the extension yoke displacement from the time the length correction drive is energized until a small force applied to the fiber is detected by the strain gage. At this point, a microswitch mounted on the stress Y-axis of the X—Y recorder is actuated and advances the stepping switch one step.

(5) The length correction drive clutch is then deenergized and the length correction modifying resistance swept out by the length correction potentiometer is held in place. Simultaneously, the elongation drive clutch is energized, and the elongation drive potentiometer sweeps out a resistance until the sample breaks. The circuitry of the elongation and length correction potentiometers producing the corrected elongation (strain) signal is such that a voltage output of the elongation potentiometer is proportional to the actual percentage elongation of the fiber sample regardless of sample length within the range of the tester.

The recorder simultaneously plots the force, corrected for denier (Y-axis) and the percentage extension applied to the sample (X-axis) during the extension yoke displacement until the fiber breaks.

(6) At the fiber breakpoint, the signal from the strain gage returns to zero, causing the stress axis of the recorder to start to return to zero. A second microswitch mounted on the stress axis of the recorder detects this reversal and causes the stepping switch to be advanced one step, stopping the slow speed motor.

(7) The strain gage circuitry is also switched, allowing the resistance which has been dialed in, proportional to denier, to produce a voltage to be impressed upon the stress axis of the recorder. Simultaneously, a time delay is introduced before the start of the fast drive, permitting the recorder to come to balance. Then, the fast speed drive clutch and motor are re-energized to return the cam and yoke and complete the cycle at the high speed. During this time the voltage impressed on the stress axis plots a straight line on the recorder having a displacement from the abscissa proportional to denier. The elongation potentiometer drive clutch remains energized. The length correction potentiometer drive clutch is energized, and both the length correction and elongation potentiometers are advanced through the remainder of their 360° rotation cycles, so that they are repositioned at their respective zero points prior to the beginning of another test.

(8) The zero points of the length correction potentiometer assembly are determined by switch-actuating cam driven directly by their respective assemblies. Each switch simultaneously deenergizes the drive clutch and energizes the brake of its potentiometer drive assembly. The yoke drive assembly is stopped at its zero position by deenergizing the high speed motor clutch by means of a microswitch actuated by a cam mounted on the yoke drive assembly shaft, similar to the potentiometer drive assembly zero point switch-actuating cam.

(9) At the end of each test the upper tab is blown free from the upper tab holder by a blast of air. The lower sample tab falls free from the extension yoke grip claws when the fiber breaks.

(10) The elastic modulus part of the curve (first part) is magnified relative to the second part. At an arbitrary point fixed with respect to fiber extension, a range change switch, actuated by a microswitch on the elongation drive assembly, reduces the sensitivity of both X- and Y-axes, so that the remainder of the curve may be plotted at a lower sensitivity.

Tests using a single range of sensitivity may be accomplished by the use of a function selector, which nullifies the effect of the range change switch. The function selection also permits plotting of curves having reduced elongation sensitivity.

Provision is mide for the determination of an abnormally early fiber break by means of a microswitch associated with the elongation drive assembly. These latter conditions are obtainable by circuits connected by different positions of the manual selector switch $S_1$.

At times it may be desirable to obtain tensile tests of single fibers looped across each other, each fiber having its ends secured to one of the fiber holding tabs. It has been found that tests run on such looped fibers generally have a relatively low tensile strength and break at a relatively low stress. It is desirable that the strain gage should, therefore, be made to provide an indication to the recorder which would be useful in connection with such tests. As a rule, it will be found that it is not necessary to have a dual range for tests of looped fibers. The manual selector switch $S_1$ may be placed in position 3 in order to operate the automatic tensile tester for this type of test.

With the manual selector switch $S_1$ in position 3, the fully automatic operation of the test system as previously explained proceeds the same as when the switch $S_1$ is in position 2, except that the range change switch $S_2$ remains continuously deenergized and the resistors $R_{14}$ and $R_{15}$ are continuously connected in series with the X-axis of the recorder through contact $D_3$ of the selector switch $S_1$. The strain gage also is continuously shunted by resistor $R_8$ through contact $B_3$ of switch $S_1$. In other respects the automatic operation of the tensile tester is the same as with this switch in position 2.

Under certain conditions, it may be desired to obtain a complete test at the relatively lower sensitivity utilizing the shunting resistor $R_9$ continuously across the strain gage 35 and the two resistors $R_{14}$ and $R_{15}$ continuously in series with the X-axis impedance circuit of the recorder. This will give a single range of sensitivity to the complete record of a test. Such an arrangement can conveniently be obtained by an automatic operation of the complete test by placing the manual selector switch $S_1$ in position 4. In this position, the operation of the range change switch $S_2$ is eliminated. The remainder of the automatic test continues the same as has been explained with reference to such a test with the manual selector switch in position 2.

Certain types of fibers may be relatively more elastic and have elongations between 50% and 100% of gage length prior to breakage thereof. It is desirable also to provide for recordation of these excessively large elongations. With such fibers, a dual range of sensitivity usually is not necessary for a proper analysis of the test results, and the manual selector switch $S_1$ may be placed in position S, so as to bypass the range change switch $S_2$. With the selector switch $S_1$ in position 5, its contact $D_5$ inserts resistors $R_{13}$, $R_{14}$, and $R_{15}$ permanently in series with the X-axis of the recorder. This provides for full scale deflection of the recorder pen 68 for 100% elongation of a test specimen. The remainder of the circuit connected by the selector switch $S_1$ is the same as that for position 4 of this switch, and the operation of the tensile tester is otherwise the same as has been explained with the selector switch $S_1$ in position 4.

While a particular embodiment of this invention has been illustrated and described, modifications thereof will occur to those skilled in the art. It is to be understood, therefore, that this invention is not to be limited to the particular details disclosed, and it is intended in the appended claims to cover all modifications within the spirit and scope of this invention.

We claim:

1. Apparatus for testing the tensile properties of fibers comprising means for holding one end of a fiber, means for holding the other end of a fiber, means for tensioning a fiber held by said two fiber holding means, and means responsive to the tensile force applied by said tensioning means on said fiber and variable in accordance with the cross-sectional area of said fiber for modifying the response thereof to said tensile force for indicating said force per unit cross-sectional area of said fiber.

2. Apparatus for testing the tensile properties of filaments comprising means for holding one end of a filament, means for holding the other end of a filament, means for tensioning that part of a filament held between said two filament holding means, means responsive to the tensile force on said filament for measuring said force, and means variable in accordance with the cross-sectional area of said filament for modifying the response of said tensile force measuring means to provide a resultant response in accordance with the tensile force per unit cross-sectional area of said filament.

3. Apparatus for testing the tensile properties of fibers comprising means for holding one end of a fiber, means for holding the other end of a fiber, means for tensioning a fiber held by said two fiber holding means, means responsive to the tensile force on said fiber for indicating said force per unit cross-sectional area of said fiber, said tensioning means being constructed and arranged to provide for progressively increasing the tension on said fiber until said fiber breaks, and means responsive to said break of said fiber for purging said apparatus of said broken fiber.

4. Apparatus for testing the tensile properties of filaments comprising means for holding one end of a filament, means for holding the other end of a filament, means for tensioning that part of a filament held between said two filament holding means, means responsive to elongation of said filament under said tension for measuring the percentage elongation of that part of said filament under said tension, means responsive to the tensile force on said filament for measuring said force, means variable in accordance with the cross-sectional area of said filament for modifying the response of said tensile force measuring means to provide a resultant response in accordance with the tensile force per unit cross-sectional area of said filament, said tensioning means being constructed and arranged to provide for progressive increase in tension on said filament until said filament breaks, and means responsive to said break of said filament for purging said apparatus of said broken filament.

5. Apparatus for testing the tensile properties of filaments comprising means for holding one end of a filament, means for holding the other end of a filament, means for tensioning that part of a filament held between said two filament holding means, means responsive to elongation of said filament under said tension for measuring the elongation of that part of said filament under said tension, and means responsive to the length of said filament prior to a predetermined stress thereon for modifying the response of said elongation responsive means to provide a measure of the percentage elongation of said filament.

6. Apparatus for testing the tensile properties of filaments comprising means for holding one end of a filament, means for holding the other end of a filament, means for tensioning that part of a filament held between said two filament holding means, means responsive to elongation of said filament under said tension for measuring the elongation of that part of said filament under said tension, means responsive to the length of said filament prior to a predetermined stress thereon for modifying the response of said elongation responsive means to provide a measure of the percentage elongation of said filament, means responsive to the tensile force on said filament for measuring said force, and means variable in accordance with the cross-sectional area of said filament for modifying the response of said tensile force measuring means to provide a resultant response in accordance with the tensile force per unit cross-sectional area of said filament.

7. Apparatus for testing the tensile properties of filaments comprising means for holding one end of a filament, means for holding the other end of a filament, means for tensioning that part of a filament held between said two filament holding means, said tensioning means being constructed and arranged to provide for progressive increase in tension on said filament until said filament breaks, means responsive to elongation of said filament under said tension for measuring the percentage elongation of that part of said filament under said tension, means responsive to the tensile force on said filament for measuring said force, and means variable in accordance with the cross-sectional area of said filament for modifying the response of said tensile force measuring means to provide a resultant response in accordance with the tensile force per unit cross-sectional area of said filament.

8. Apparatus for testing the tensile properties of filaments comprising means for holding one end of a filament, means for holding the other end of a filament, means for tensioning that part of a filament held between said two filament holding means, means responsive to elongation of said filament under said tension for measuring the elongation of that part of said filament under said tension, means responsive to the length of said filament prior to a predetermined stress thereon for modifying the response of said elongation responsive means to provide a measure of the percentage elongation of said filament, means responsive to the tensile force on said filament for measuring said force, means variable in accordance with the cross-sectional area of said filament, means responsive to said variable means for modifying the response of said tensile force measuring means to provide a resultant response in accordance with the tensile force per unit cross-sectional area of said filament, said tensioning means being constructed and arranged to provide for progressive increase in tension on said filament until said filament breaks, and means responsive to said break of said filament for indicating the pre-stressed cross-sectional area of said filament in accordance with said variable means.

9. Apparatus for testing the tensile properties of filaments comprising means for holding one end of a filament, means for holding the other end of a filament, means for tensioning a filament held by said two filament holding means, means responsive to elongation of said filament under said tension for measuring the percentage elongation of that part of said filament under said tension, means responsive to the tensile force on said filament for measuring said force, means variable in accordance with the cross-sectional area of said filament for modifying the response of said tensile force measuring means to provide a resultant response in accordance with the tensile force stress per unit cross-sectional area of said filament, means for recording the relationship of said percentage elongation to said stress per unit cross-sectional area, said tensioning means being constructed and arranged to provide for progressive increase in tension on said filament until said filament breaks, and means responsive to said break of said filament for purging said apparatus of said broken filament.

10. Apparatus for testing the tensile properties of filaments comprising means for holding one end of a filament, means for holding the other end of a filament, means for moving said holding means apart for tensioning a filament held by said two filament holding means, means responsive to the length of said filament prior to a predetermined stress thereon for indicating said length, means responsive to elongation of said filament under said tension for measuring the elongation of that part of said filament under said tension as a percentage of said indicated length, means responsive to the tensile force on said filament for measuring said force, variable means adjustable in accordance with the cross-sectional area of said filament, means responsive to said varaible means for modifying the response of said tensile force measuring means to provide a resultant response in accordance with the tensile force stress per unit cross-sectional area of said filament, said tensioning means constructed and arranged to provide for progressive increase in tension on said filament until said filament breaks, means responsive to said break of said filament for purging said apparatus of said broken filament, and other means responsive to said break of said filament for indicating the cross-sectional area of said filament as in acocrdance with said variable means.

11. Apparatus for testing the tensile properties of filaments comprising means for holding one end of a filament, means for holding the other end of a filament, means for moving said holding means apart for tensioning a filament held by said two filament holding means, means responsive to the length of said filament prior to a predetermined stress thereon for indicating said length, means responsive to elongation of said filament under said tension for measuring the elongation of that part of sad filament under said tension as a percentage of said indicated length, means responsive to the tensile force on said filament for measuring said force, variable means adjustable in accordance with the cross-sectional area of said filament, means responsive to said variable means for modifying the response of said tensile force measuring means to provide a resultant response in accordance with the tensile force stress per unit cross-sectional area of said filament, and said tensioning means constructed and arranged to provide for progressive increase in tension on said filament until said filament breaks.

12. Apparatus for testing the tensile properties of specimens comprising means for holding one end of a specimen, means for holding the other end of a specimen, means for tensioning a specimen held by said two specimen holding means, length correction means responsive to the length of said specimen prior to a predetermined stress thereon for indicating said length, means responsive to elongation of said specimen under said tension for measuring the elongation of that part of said specimen under said tension as a percentage of said indicated length, means responsive to the tensile force on said specimen for measuring said force, variable means adjustable in accordance with the cross-sectional area of said specimen, means responsive to the adjustment of said variable means for modifying the response of said tensile force measuring means to provide a resultant response in accordance with the tensile force stress per unit cross-sectional area of said specimen, means for recording the relationsip of said percentage elongation to said stress per unit cross-sectional area on predetermined high sensitivity scales, means responsive to a predetermined percentage elongation for changing the scales of indications recorded to predetermined low sensitivity scales, means for stopping the recording during the change from high to low sensitivity scales, said tensioning means being constructed and arranged to provide for progressive increase in tension on said filament until said specimen breaks, means responsive to said break of said specimen for indicating the cross-sectional area of said specimen as indicated by said variable means, and said recording means being responsive to said specimen break responsive means for recording said specimen cross-sectional area according to the adjustment of said variable means.

13. Apparatus for testing the tensile properties of specimens comprising means for holding one end of a specimen, means for holding the other end of a specimen, means for tensioning a specimen held by said two specimen holding means, means responsive to the length of said specimen prior to a predetermined stress thereon for indicating said length, means responsive to elongation of said specimen under said tension for measuring the percentage elongation of that part of said specimen under said tension as a percentage of said indicated length, means responsive to the tensile force on said specimen for measuring said force, variable means adjustable in accordance with the cross-sectional area of said specimen, means responsive to said variable means adjustment for modifying the response of said tensile force measuring means to provide a resultant response in accordance with the tensile force stress per unit cross-sectional area of said specimen, means for recording the relationship of said percentage elongation to said stress per unit cross-sectional area on predetermined high sensitivity scales, means responsive to a predetermined percentage elongation for changing the scales of indications recorded to predetermined low sensitivity scales, means for stopping the recording during the change from high to low sensitivity scales, said tensioning means being constructed and arranged to provide for progressive increase in tension on said specimen until said specimen breaks, means responsive to said break of said specimen for purging said apparatus of said broken specimen, other means responsive to said break of said specimen for indicating the cross-sectional area of said specimen as indicated by said variable means, and said recording means being responsive to said other means for recording said specimen cross-sectional area in accordance with the adjustment of said variable means.

14. Apparatus for testing the tensile properties of specimens comprising means for holding one end of a specimen, second means for holding the other end of the specimen, means for tensioning that part of a specimen held between said two specimen holding means, said tensioning means being constructed and arranged to provide a relatively high speed advance of said tensioning means to a predetermined position just short of stressing said specimen, means responsive to said predetermined position of said tensioning means for reducing the speed of advance of said tensioning means to a predetermined lower substantially constant speed and for progressive increase in tension on said specimen until said specimen breaks, length correction means responsive to the length of said specimen prior to a predetermined stress thereon for indicating said length, means responsive to elongation of said specimen under said tension for measuring the elongation of that part of said specimen under said tension as a percentage of said indicated length, means responsive to the tensile force on said specimen for measuring said force, means variable in accordance with the cross-sectional area of said specimen, means responsive to said variable means for modifying the response of said tensile force measuring means to provide a resultant response in accordance with the tensile force per unit cross-sectional area of said specimen, means responsive to said break of said specimen for indicating said break, means responsive to said break indication for returning said elongation measuring means to zero position, second means responsive to the said break indication for returning said length correction means to zero position, means for stopping said elongation measuring means in zero position, means for stopping said length correction means in zero position, means having a time-delayed response to said break indication for increasing the speed of said tensioning means and providing for return thereof to starting position, and other means responsive to said break indication for indicating the cross-sectional area of said specimen as in accordance with said variable means.

15. Apparatus for testing the tensile properties of specimens comprising means for holding one end of a specimen, means for holding the other end of a specimen, means for tensioning a specimen held by said two specimen holding means, means responsive to elongation of said specimen under said tension for measuring the percentage elongation of that part of said specimen under said tension, means responsive to the tensile force on said specimen for measuring said force, means variable in accordance with the cross-sectional area of said specimen for modifying the response of said tensile force measuring means to provide a resultant response in accordance with the tensile force stress per unit cross-sectional area of said filament, means for recording the relationship of said percentage elongation to said stress per unit cross-sectional area, said tensioning means being constructed and arranged to provide for progressively increasing the tension on said specimen at a regular speed until said specimen breaks.

16. Apparatus for testing the tensile properties of specimens comprising means for holding one end of a specimen, means for holding the other end of a specimen, means for tensioning a specimen held by said two specimen holding means, electrical means for driving said tensioning means at an initial high speed prior to the application of tension on said specimen to a predetermined gage length position, means responsive to the position of said tensioning means at said gage length for modifying the driven speed of said tensioning means to a lower speed, means responsive to elongation of said specimen under said tension for measuring the percentage elongation of that part of said specimen under said tension, means responsive to the tensile force on said specimen for measuring said force, means variable in accordance with the cross-sectional area of said specimen for modifying the response of said tensile force measuring means to provide a resultant response in accordance with the tensile force stress per unit cross-sectional area of said filament, means for recording the relationship of said percentage elongation to said stress per unit cross-sectional area, said tensioning means being constructed and arranged to provide for progressively increasing the tension on said specimen at a regular speed until said specimen breaks, and means responsive to said break of said specimen for purging said apparatus of said broken specimen.

17. Apparatus for testing the tensile properties of specimens comprising means for holding one end of a specimen, means for holding the other end of a specimen, means for tensioning a specimen held by said two specimen holding means, means responsive to elongation of said specimen under said tension for measuring the percentage elongation of that part of said specimen under said tension, means responsive to the tensile force on said specimen for measuring said force, means variable in accordance with the cross-sectional area of said specimen for modifying the response of said tensile force measuring means to provide a resultant response in accordance with the tensile force stress per unit cross-sectional area of said filament, means for recording the relationship of said percentage elongation to said stress per unit cross-sectional area, said tensioning means being constructed and arranged to provide for progressively increasing the tension on said specimen until said specimen breaks, means responsive to said break of said specimen for purging said apparatus of said broken specimen, other means responsive to said break of said specimen for indicating the cross-sectional area of said specimen in accordance with said variable means, and said recording means being responisve to said other means for recording said specimen indicated size.

18. Apparatus for testing the tensile properties of specimens comprising means for holding one end of a specimen, means for holding the other end of a specimen, means for tensioning a specimen held by said two specimen holding means, electrical means for driving said tensioning means at an initial high speed prior to the application of tension on said specimen to a predetermined gage length position, means responsive to the position of said tensioning means at said gage length for modifying the driven speed of said tensioning means to a lower speed, means responsive to elongation of said specimen under said tension for measuring the percentage elongation of that part of said specimen under said tension, means responsive to the tensile force on said specimen for measuring said force, means variable in accordance with the cross-sectional area of said specimen for modifying the response of said tensile force measuring means to provide a resultant response in accordance with the tensile force stress per unit cross-sectional area of said filament, means for recording the relationship of said percentage elongation to said stress per unit cross-sectional area, means responsive to a predetermined percentage elongation for changing the scale of said recording means to a predetermined lower sensitivity, means for stopping the recording during the change to said lower sensitivity, said tensioning means being constructed and arranged to provide for progressively increasing the tension on said specimen at a regular speed until said specimen breaks, means responsive to said break of said specimen for purging said apparatus of said broken specimen, other means responsive to said break of said specimen for indicating the cross-sectional area of said specimen in accordance with said variable means, and said recording means being responsive to said other means for recording said specimen cross-sectional area.

19. Apparatus for testing the tensile properties of specimens comprising means for holding one end of a specimen, second means for holding the other end of the specimen, means for tensioning that part of a specimen held between said two specimen holding means, said tensioning means being constructed and arranged to provide a relatively high speed advance of said tensioning means to a predetermined position just short of stressing said specimen, means responsive to said predetermined position of said tensioning means for reducing the speed of advance of said tensioning means to a predetermined lower substantially constant speed and for progressive increase in tension on said specimen until said specimen breaks, length correction electrical potentiometer means responsive to the length of said specimen prior to a predetermined stress thereon for providing an electrical voltage in accordance with said length, electrical potentiometer means responsive to elongation of said specimen for providing an electrical signal modified inversely with said length correction potentiometer voltage for measuring the elongation of that part of said specimen under said tension as a percentage of said length, electrical strain gage means responsive to the tensile force on said specimen for providing a signal in accordance with said force, means variable in accordance with the cross-sectional area of said specimen, means responsive to said variable means for modifying the response of said strain gage to provide a resultant signal in accordance with the tensile force per unit cross-sectional area of said specimen, means responsive to said break of said specimen for returning said potentiometer elongation measuring means to zero position, second means responsive to the said break of said specimen for returning said potentiometer length correction means to zero position, means for stopping said potentiometer elongation measuring means in zero position, means for stopping said potentiometer length correction means in zero position, means having a time-delay response to said break for increasing the speed of said tensioning means and providing for return thereof to starting position, and other means responsive to said break of said specimen for indicating the cross-sectional area of said specimen in accordance with said variable means.

20. Apparatus for testing the tensile properties of specimens comprising means for holding one end of a specimen, second means for holding the other end of the specimen, means for tensioning that part of a specimen held between said two specimen holding means, said tensioning means being constructed and arranged to provide a relatively high speed advance of said tensioning means to a predetermined position just short of stressing said specimen, means responsive to said predetermined position of said tensioning means for reducing the speed of advance of said tensioning means to a predetermined lower substantially constant speed and for progressive increase in tension on said specimen until said specimen breaks, length correction electrical potentiometer means responsive to the length of said specimen prior to a predetermined stress thereon for providing an electrical voltage in accordance with said length, electrical potentiometer means responsive to elongation of said specimen for providing an electrical signal modified inversely with said length correction potentiometer voltage for measuring the elongation of that part of said specimen under said tension as a percentage of said length, electrical strain gage means responsive to the tensile force on said specimen for providing a signal in accordance with said force, means variable in accordance with the cross-sectional area of said specimen, means responsive to said variable means for modifying the response of said strain gage to provide a resultant signal in accordance with the tensile force per unit cross-sectional area of said specimen, means for continuously recording the relationship of said percentage elongation to concurrent tensile force per unit cross-sectional area on said specimen in response to said electrical signals thereof, means responsive to said break of said specimen for returning said potentiometer elongation measuring means to zero position, second means responsive to the said break of said specimen for returning said potentiometer length correction means to zero position, means for stopping said potentiometer elongation measuring means in zero position, means for stopping said potentiometer length correction means in zero position, and means having a time-delay response to said break for increasing the speed of said tensioning means and providing for return thereof to starting position.

21. Apparatus for testing the tensile properties of specimens comprising means for holding one end of a specimen, second means for holding the other end of the specimen, means for tensioning that part of a specimen held between said two specimen holding means, cam means for driving said tensioning means constructed to provide a relatively high speed advance of said tensioning means to a predetermined position just short of stressing said specimen, means responsive to said predetermined position of said tensioning means for reducing the operating speed of said cam means, said cam means being constructed for driving said tensioning means to progressively increase the tension on said specimen at a constant rate until said specimen breaks, length correction electrical potentiometer means responsive to the length of said specimen prior to a predetermined stress thereon for providing an electrical voltage in accordance with said length, electrical potentiometer means responsive to elongation of said specimen for providing an electrical signal modified inversely with said length correction potentiometer voltage for measuring the elongation of that part of said specimen under said tension as a percentage of said length, electrical strain gage means responsive to the tensile force on said specimen for providing a signal in accordance with said force, means variable in accordance with the cross-sectional area of said specimen, means responsive to said variable means for modifying the response of said strain gage to provide a resultant signal in accordance with the tensile force per unit cross-sectional area of said specimen, means for continuously recording the relationship of said percentage elongation to concurrent tensile force per unit cross-sectional area on said specimen in response to said electrical signals thereof, means responsive to said break of said specimen for returning said potentiometer elongation measuring means to zero position, second means responsive to the said break of said specimen for returning said potentiometer length correction means to zero position, means for stopping said potentiometer elongation measuring means in zero position, means for stopping said potentiometer length correction means in zero position, means having a time-delay for increasing the speed of said cam means, and said cam means being constructed to provide for return of said tensioning means to starting position, and other means responsive to said break of said specimen for indicating the cross-sectional area of said specimen in accordance with said variable means.

22. Apparatus for testing the tensile properties of specimens comprising means for holding one end of a specimen, second means for holding the other end of the specimen, means for tensioning that part of a specimen held between said two specimen holding means, cam means for driving said tensioning means, said cam means being constructed to provide a relatively high initial acceleration of said tensioning means to a predetermined position just short of stressing said specimen, electrical means for driving said cam means at a relatively high speed, electrical means for driving said cam means at a relatively low speed, clutch means connecting said high speed drive means to said cam means, an overriding clutch connecting said low speed drive means to said cam means and providing for drive of said cam means by said high speed drive means during simultaneous operation of said low speed drive means, means responsive to said predetermined position of said tensioning means for unclutching said high speed drive means from said cam means and for driving said cam means by said low speed drive means for reducing the speed of advance of said tensioning means to a predetermined lower substantially constant speed and for progressive increase in tension on said specimen until said specimen breaks, length correction means responsive to the length of said specimen prior to a predetermined stress thereon for indicating said length, means responsive to elongation of said specimen under said tension for measuring the elongation of that part of said specimen under said tension as a percentage of said indicated length, means responsive to the tensile force on said specimen for measuring said force, means variable in accordance with the cross-sectional area of said specimen, means responsive to said variable means for modifying the response of said tensile force measuring means to provide a resultant response in accordance with the tensile force per unit cross-sectional area of said specimen, means responsive to said break of said specimen for reclutching said high speed drive means to said cam means for returning said elongation measuring means to zero position and for returning said length correction means to zero position at relatively high speed, means for stopping said elongation measuring means in zero position, means for stopping said length correction means in zero position, and said reclutched high speed drive means also providing for return of said tensioning means to starting position.

23. Apparatus for testing the tensile properties of fibers comprising means for holding one end of a specimen, means for holding the other end of said specimen, means for tensioning said specimen held by said two holding means until said specimen breaks, means responsive to the tensile force on said specimen for indicating said force, and means responsive to said break of said specimen for projecting an air jet on said apparatus for removing said broken specimen therefrom.

24. Apparatus for testing the tensile properties of specimens comprising length correction electrical potentiometer means responsive to the length of said specimen prior to a predetermined stress thereon for providing an electrical voltage in accordance with said length, means for holding a specimen and applying a tensile force thereon, and electrical potentiometer means responsive to elongation of a specimen under application of said tensile force thereto for providing an electrical signal modified inversely with said length correction potentiometer voltage for measuring the elongation of that part of said specimen under said tension as a percentage of said length.

25. Apparatus for testing the tensile properties of specimens comprising means for holding one end of a specimen, second means for holding the other end of the specimen, means for tensioning that part of a specimen held between said two specimen holding means, a drive shaft for said tensioning means, a high speed drive, a low speed drive, an overriding clutch means for connecting said low speed drive to said tensioning means through said drive shaft, other clutch means for connecting said high speed drive to said tensioning means through said drive shaft and making said low speed drive ineffective through said overriding clutch, means for controlling said high speed drive and other clutch means to provide a relatively high speed advance of said tensioning means to a predetermined position just short of stressing said specimen, means responsive to said predetermined position of said tensioning means for disconnecting said other clutch means thereby reducing the speed of advance of said tensioning means to a predetermined lower substantially constant speed for progressive increase in tension on said specimen at a constant rate until said specimen breaks, length correction means responsive to the length of said specimen prior to a predetermined stress thereon for indicating said length, means responsive to elongation of said specimen under said tension for measuring the elongation of that part of said specimen under said tension as a percentage of said indicated length, electrical means responsive to the tensile force on said specimen for providing an electrical indication in accordance with said force, means variable in accordance with the cross-sectional area of said specimen, means responsive to said variable means for modifying the response of said tensile force responsive means to provide a resultant response in accordance with the tensile force per unit cross-sectional area of said specimen, means responsive to said break of said specimen for returning said elongation measuring means to zero position, second means responsive to the said break of said specimen for returning said length correction means to zero position, means for stopping said elongation measuring means in zero position, means for stopping said length correction means in zero position, means having a time-delay response to said break for reconnecting said high speed drive through said other clutch thereby to drive said drive shaft at a high speed and increasing the speed of said tensioning means and providing for return thereof to starting position.

26. A tensile tester tensioning drive comprising a source of driving power, tensioning means, cam means for transmitting driving power from said source in predetermined relations thereto to said tensioning means, said predetermined relations being formed into said cam means as a continuous smoothly varying camming surface increasing gradually in radius from a predetermined minimum at zero drive position to a predetermined second radius for providing a relatively high speed advance of said tensioning means from which second radius said camming surface radius increases at a uniform rate according to a hypocycloid for advancing said tensioning means at substantially constant speed to a third predetermined radius of substantially twice said second radius from which third radius said camming surface radius varies at a lesser rate to a fourth predetermined radius from which fourth radius said cam means has a short dwell camming surface of substantially constant radius from which constant radius said camming surface radius decreases gradually to said initial minimum radius at said zero drive position, said tensioning means comprising a drawbar, a specimen holder mounted on said drawbar, a cam follower operatively secured to said drawbar, and resilient spring means operatively connected to said drawbar and cam follower for biasing said cam follower into driving engagement with said camming surface.

27. A tensile tester tensioning drive comprising a source of driving power, tensioning means, cam means for transmitting driving power from said source in predetermined relations thereto to said tensioning means, said predetermined relations being formed into said cam means as a continuous smoothly varying camming surface increasing gradually in radius from a predetermined minimum at zero drive position to a predetermined second radius for providing a relatively high speed advance of said tensioning means for substantially a half quadrant from which second radius said camming surface radius increases at a uniform rate circumferentially for substantially 180° according to a hypocycloid for advancing said tensioning means at substantially constant speed to a third predetermined radius of substantially twice said second radius from which third radius said camming surface radius varies at a lesser rate for substantially a half quadrant to a fourth predetermined radius from which fourth radius said cam means has a dwell camming surface of substantially constant radius for approximately 10° from which constant radius said camming surface radius decreases gradually to said initial minimum radius at said zero drive position, a specimen holder, a tension bar, said tensioning means including an elongation yoke comprising a drawbar, a specimen holder mounted on said drawbar, a cam follower operatively secured to said drawbar, and resilient spring means operatively connected to said drawbar and cam follower for biasing said cam follower into driving engagement with said camming surface.

28. A tensile tester tensioning drive comprising a source of driving power, cam means for transmitting driving power from said source in predetermined relations thereto, said predetermined relations being formed into said cam means as a continuous smoothly varying camming surface increasing gradually in radius from a predetermined minimum at zero drive position to a predetermined second radius for substantially a half quadrant from which second radius said camming surface radius increases at a uniform rate circumferentially for substantially 180° according to a hypocycloid to a third predetermined radius of substantially twice said second radius from which third radius said camming surface radius varies at a lesser rate for substantially a half quadrant to a fourth predetermined radius from which fourth radius said camming surface has a substantially constant radius for approximately 10° from which constant radius said camming surface radius decreases gradually to said initial minimum radius at said zero drive position, a specimen holder, a tension bar, an elongation yoke comprising a pair of spaced guide bars, a bearing block slidably mounting said guide bars therein, a bracket mounted on said guide bars on one side of said bearing block with one of said guide bars laterally movable therein to prevent binding thereof, a second bracket mounted on said guide bars on the other side of said bearing block with said one guide bar laterally movable therein to prevent binding thereof, a drawbar secured to said second bracket, a specimen holder mounted on said drawbar, a cam follower operatively secured to said drawbar and mounted on said second bracket, and resilient spring means operatively connected to said drawbar and cam follower through said second bracket and to said bearing block for biasing said cam follower into driving engagement with said camming surface.

29. A tensile tester drive comprising cam means for transmitting driving power, said cam means comprising a continuous smoothly varying camming surface increasing gradually in radius from a predetermined minimum at zero drive position to a predetermined second radius for substantially a half quadrant from which second radius said camming surface radius increases at a uniform rate according to a hypocycloid to a third predetermined radius of substantially twice said second radius from which third radius said camming surface radius varies at a lesser rate for substantially a half quadrant to a fourth predetermined radius from which fourth radius said camming surface has a short substantially constant radius from which constant radius said camming surface radius decreases gradually to said initial minimum radius at said zero drive position, a cam follower, and means operatively connected to said cam follower for biasing said cam follower into driving engagement with said camming surface.

30. A tensile tester tensioning drive comprising a source of driving power, cam means for transmitting driving power from said source in predetermined relations thereto, said predetermined relations being formed into said cam means as a continuous smoothly varying camming surface increasing gradually in radius from a predetermined minimum at zero drive position to a predetermined second radius for substantially a half quadrant from which second radius said camming surface radius increases at a uniform rate circumferentially for substantially 180° according to a hypocycloid to a third predetermined radius of substantially twice said second radius from which third radius said camming surface radius varies at a lesser rate for substantially a half quadrant to a fourth predetermined radius from which fourth radius said camming surface has a substantially constant radius for approximately 10° from which constant radius said camming surface radius decreases gradually to said initial minimum radius at said zero drive position, a cam follower, and resilient means operatively connected to said cam follower for biasing said cam follower into driving engagement with said camming surface.

31. Apparatus for testing the tensile properties of filaments comprising means for holding one end of a filament, means for holding the other end of a filament, means for tensioning that part of a filament held between said two filament holding means, a source of voltage, electrical potentiometer means variable in accordance with elongation of said filament under said tension for measuring the elongation of that part of said filament under said tension, electrical potentiometer means variable in accordance with the length of said filament prior to a predetermined stress thereon and connected in series with said first mentioned potentiometer and across said source of voltage for modifying the response of said first mentioned potentiometer to provide a measure of the percentage elongation of said filament.

32. Apparatus for testing the tensile properties of filaments comprising means for holding one end of a filament, means for holding the other end of a filament, means for tensioning that part of a filament held between said two filament holding means, a source of voltage, electrical potentiometer means variable in accordance with elongation of said filament under said tension for measuring the elongation of that part of said filament under said tension, electrical potentiometer means responsive to and variable in accordance with the length of said filament prior to a predetermined stress thereon and connected in series with said first mentioned potentiometer and across said source of voltage for modifying the response of said first mentioned potentiometer to provide a measure of the percentage elongation of said filament, means responsive to the tensile force on said filament for measuring said force, and means variable in accordance with the cross-sectional area of said filament for modifying the response of said tensile force measuring means to provide a resultant response in accordance with the tensile force per unit cross-sectional area of said filament.

33. A specimen loading chute and tab holder for a tensile tester comprising a tab holder having sides spaced for centering a fiber holding tab therebetween, tab retaining lower sides on said tab holder spaced apart to allow free suspension of a fiber therebetween, and a chute portion having a pair of tapered guide members with a narrow downwardly extending slot therebetween for allowing a fiber to pass freely along said slot and guiding a tab secured thereto into position on said tab retaining sides of said tab holder.

34. A specimen loading chute and tab holder for a tensile tester comprising a tab holder having sides spaced for centering a fiber holding tab therebetween, tab retaining lower sides on said tab holder, spaced apart to allow free suspension of a fiber therebetween, said tab holder having a central opening therein to allow the projection of a jet of air therethrough for blowing tabs out of said holder, a chute portion having a pair of tapered guide members with a narrow downwardly extending slot therebetween for allowing a fiber to pass freely along said slot and guiding a tab secured thereto into position on said tab retaining sides of said tab holder, and means for pivotally mounting said chute.

35. Apparatus for testing the tensile properties of specimens comprising means for holding one end of a specimen, second means for holding the other end of the specimen, means for tensioning that part of a specimen held between said two specimen holding means, a drive shaft for said tensioning means, a high speed electric drive, a low speed electric drive, an overriding clutch means for connecting said low speed drive to said tensioning means through said drive shaft, other clutch means for connecting said high speed drive to said tensioning means through said drive shaft and making said low speed drive ineffective through said overriding clutch, means for controlling said high speed electric drive and other clutch means to provide a relatively high speed advance of said tensioning means to a predetermined position just short of stressing said specimen, means responsive to said predetermined position of said tensioning means for disconnecting said other clutch means thereby reducing the speed of advance of said tensioning means to a predetermined lower substantially constant speed for progressive increase in tension on said specimen at a constant rate until said specimen breaks, length correction potentiometer means responsive to the length of said specimen prior to a predetermined stress thereon for providing an electrical voltage indication in accordance with said length, potentiometer means responsive to elongation of said specimen for providing an electrical voltage indication modified inversely with said length correction potentiometer indication for measuring the elongation of that part of said specimen under said tension as a percentage of said length, electrical means responsive to the tensile force on said specimen for providing an electrical indication in accordance with said force, means variable in accordance with the cross-sectional area of said specimen, means responsive to said variable means for modifying the response of said tensile force responsive means to provide a resultant response in accordance with the tensile force per unit cross-sectional area of said specimen, means responsive to said break of said specimen for returning said elongation measuring means to zero position, second means responsive to the said break of said specimen for returning said length correction means to zero position, means for stopping said elongation measuring means in zero position, means for stopping said length correction means in zero position, and means having a time-delay response to said break for increasing the speed of said tensioning means and providing for return thereof to starting position.

References Cited in the file of this patent

UNITED STATES PATENTS

| | | |
|---|---|---|
| 2,109,171 | Gould | Feb. 22, 1938 |
| 2,400,920 | Cummings | May 28, 1946 |
| 2,831,342 | Adler et al. | Apr. 22, 1958 |
| 2,857,758 | Snyder | Oct. 28, 1958 |
| 2,880,609 | Byrkett et al. | Apr. 7, 1959 |

OTHER REFERENCES

Publication: Review Scientific Instruments, vol. 20, July 1949, pages 509–516. Article by Reichard et al.